(12) United States Patent
Delgado et al.

(10) Patent No.: US 12,414,602 B2
(45) Date of Patent: Sep. 16, 2025

(54) ADDITIVELY MANUFACTURED FOOTWEAR SOLES

(71) Applicant: adidas AG, Herzogenaurach (DE)

(72) Inventors: Christian Manuel Arias Delgado, Portland, OR (US); Berin B, Portland, OR (US); Ladan Salari-Sharif, Camas, WA (US); Keith A. Blume, Portland, OR (US); Stephen P. Dobson, Portland, OR (US)

(73) Assignee: adidas AG, Herzogenaurach (DE)

(*) Notice: Subject to any disclaimer, the term of this patent is extended or adjusted under 35 U.S.C. 154(b) by 0 days.

(21) Appl. No.: 18/400,729

(22) Filed: Dec. 29, 2023

(65) Prior Publication Data

US 2025/0212993 A1    Jul. 3, 2025

(51) Int. Cl.
  *A43B 13/18* (2006.01)
  *A43B 13/22* (2006.01)

(52) U.S. Cl.
  CPC .............. *A43B 13/18* (2013.01); *A43B 13/22* (2013.01)

(58) Field of Classification Search
  CPC ................................ A43B 13/18; A43B 13/22
  See application file for complete search history.

(56) References Cited

U.S. PATENT DOCUMENTS

| | | |
|---|---|---|
| 354,693 A | 12/1886 | Dick |
| 1,111,437 A | 9/1914 | Butterfield |
| 2,205,356 A | 6/1940 | Rose et al. |
| 2,853,809 A | 9/1958 | Carlo |
| 3,253,601 A | 5/1966 | Scholl |
| 3,416,174 A | 12/1968 | Novitske |
| 3,793,750 A | 2/1974 | Bowerman |

(Continued)

FOREIGN PATENT DOCUMENTS

| | | |
|---|---|---|
| CN | 101611953 A | 12/2009 |
| CN | 102578760 A | 7/2012 |

(Continued)

OTHER PUBLICATIONS

"Adidas Breaks the Mould With 3D-Printed Performance Footwear," Adidas Group, [Retrieved on Oct. 7, 2015], Retrieved from the Internet: ( http://www.adidas-group.com/en/media/news-archive/press-releases/2015/adi-das-breaks-mould-3d-printed-performance-footwear/ ).

(Continued)

*Primary Examiner* — Bao-Thieu L Nguyen
(74) *Attorney, Agent, or Firm* — Sterne, Kessler, Goldstein &Fox P.L.L.C.

(57) ABSTRACT

Articles of footwear comprising an additively manufactured sole. In some embodiments, the article of footwear may comprise a sole, an upper, and a joining element coupling the sole to the upper. In some embodiments, the sole may comprise a three-dimensional mesh with a ground-facing portion and a ledge formed on an upper side of the mesh. The ledge may comprise a continuous side surface that is coupled to the joining element. In some embodiments, the sole may comprise an undulating lower side comprising a plurality of bumps and a plurality of valleys positioned between respective bumps. In some embodiments, the sole may comprise a continuous ground-facing rim formed on a perimeter portion of a lower side of the sole.

18 Claims, 11 Drawing Sheets

(56) References Cited

U.S. PATENT DOCUMENTS

| | | | |
|---|---|---|---|
| 4,012,855 A | 3/1977 | Gardner | |
| 4,271,606 A | 6/1981 | Rudy | |
| 4,297,796 A | 11/1981 | Stirtz et al. | |
| 4,309,831 A | 1/1982 | Pritt | |
| 4,316,335 A | 2/1982 | Giese et al. | |
| 4,378,643 A | 4/1983 | Johnson | |
| D272,963 S | 3/1984 | Muller et al. | |
| 4,439,936 A | 4/1984 | Clarke et al. | |
| 4,607,440 A | 8/1986 | Roberts et al. | |
| 4,638,577 A | 1/1987 | Riggs | |
| 4,774,774 A | 10/1988 | Allen, Jr. | |
| 5,224,279 A | 7/1993 | Agnew | |
| 5,236,637 A | 8/1993 | Hull | |
| 5,337,492 A | 8/1994 | Anderie et al. | |
| 5,367,791 A | 11/1994 | Gross et al. | |
| 5,391,072 A | 2/1995 | Lawton et al. | |
| 5,423,135 A | 6/1995 | Poole et al. | |
| 5,529,473 A | 6/1996 | Lawton et al. | |
| 5,713,140 A | 2/1998 | Baggenstoss | |
| 5,799,417 A | 9/1998 | Burke et al. | |
| 5,862,614 A | 1/1999 | Koh | |
| 5,930,916 A | 8/1999 | Connor | |
| 5,983,529 A | 11/1999 | Serna | |
| 5,985,383 A | 11/1999 | Allen et al. | |
| 6,014,821 A | 1/2000 | Yaw | |
| 6,021,588 A | 2/2000 | Alviso | |
| 6,065,229 A | 5/2000 | Wahrheit | |
| 6,076,283 A | 6/2000 | Boie | |
| 6,231,946 B1 | 5/2001 | Brown, Jr. et al. | |
| 6,259,962 B1 | 7/2001 | Gothait | |
| 6,367,172 B2 | 4/2002 | Hernandez | |
| 6,665,958 B2 | 12/2003 | Goodwin | |
| 6,763,611 B1 * | 7/2004 | Fusco | A43B 13/181 36/27 |
| 7,383,647 B2 | 6/2008 | Chan et al. | |
| 7,438,846 B2 | 10/2008 | John | |
| 7,676,955 B2 | 3/2010 | Dojan et al. | |
| 7,704,430 B2 | 4/2010 | Johnson et al. | |
| 7,892,474 B2 | 2/2011 | Shkolnik et al. | |
| 8,110,135 B2 | 2/2012 | El-Siblani | |
| 8,191,284 B2 | 6/2012 | Cho | |
| 8,522,454 B2 | 9/2013 | Schindler et al. | |
| 8,739,639 B2 | 6/2014 | Owings et al. | |
| 8,776,396 B2 | 7/2014 | Huynh | |
| 8,914,998 B2 | 12/2014 | Gheorghian et al. | |
| 8,978,272 B2 | 3/2015 | Hurd et al. | |
| 9,205,601 B2 | 12/2015 | DeSimone et al. | |
| 9,211,678 B2 | 12/2015 | DeSimone et al. | |
| 9,216,546 B2 | 12/2015 | DeSimone et al. | |
| 9,320,316 B2 | 4/2016 | Guyan et al. | |
| 9,453,142 B2 | 9/2016 | Rolland et al. | |
| 9,480,298 B2 | 11/2016 | Barnes et al. | |
| D789,060 S | 6/2017 | Guyan et al. | |
| 9,756,894 B2 | 9/2017 | McDowell et al. | |
| D809,752 S | 2/2018 | Campbell | |
| 9,930,929 B2 | 4/2018 | Cooper et al. | |
| 10,010,133 B2 | 7/2018 | Guyan | |
| 10,010,134 B2 | 7/2018 | Guyan | |
| 10,016,013 B2 | 7/2018 | Kormann et al. | |
| 10,034,516 B2 | 7/2018 | Gheorghian et al. | |
| 10,039,343 B2 | 8/2018 | Guyan | |
| D829,425 S | 10/2018 | Albrecht et al. | |
| D831,315 S | 10/2018 | Mahoney | |
| 10,104,934 B2 | 10/2018 | Guyan | |
| 10,143,266 B2 | 12/2018 | Spanks | |
| D841,300 S | 2/2019 | Albrecht et al. | |
| D841,301 S | 2/2019 | Albrecht et al. | |
| 10,231,511 B2 | 3/2019 | Guyan et al. | |
| 10,259,171 B2 | 4/2019 | Robeson et al. | |
| D847,481 S | 5/2019 | Albrecht et al. | |
| D857,362 S | 8/2019 | Thompson | |
| D859,801 S | 9/2019 | Jenkins et al. | |
| D862,051 S | 10/2019 | Goussev et al. | |
| D862,866 S | 10/2019 | Albrecht et al. | |
| 10,426,226 B2 | 10/2019 | Guyan et al. | |
| 10,434,706 B2 | 10/2019 | Robeson et al. | |
| D873,546 S | 1/2020 | Henrichot | |
| D876,056 S | 2/2020 | Henrichot | |
| D878,016 S | 3/2020 | Henrichot | |
| D879,428 S | 3/2020 | Braun et al. | |
| D879,434 S | 3/2020 | Fick et al. | |
| 10,575,588 B2 | 3/2020 | Perrault et al. | |
| D880,120 S | 4/2020 | Fick et al. | |
| D880,122 S | 4/2020 | Fick et al. | |
| D880,131 S | 4/2020 | Fick et al. | |
| D882,227 S | 4/2020 | Braun et al. | |
| 10,639,861 B2 | 5/2020 | Minh et al. | |
| D890,485 S | 7/2020 | Perrault et al. | |
| D907,904 S | 1/2021 | Perrault et al. | |
| 11,076,656 B2 | 8/2021 | Kormann et al. | |
| 11,399,593 B2 | 8/2022 | Cross et al. | |
| 11,589,647 B2 | 2/2023 | Hettinga et al. | |
| D980,595 S * | 3/2023 | Salari-Sharif | D2/947 |
| 12,161,185 B2 * | 12/2024 | Hettinga | B33Y 10/00 |
| 2002/0078598 A1 | 6/2002 | Bell | |
| 2004/0087230 A1 | 5/2004 | Wildeman | |
| 2006/0201028 A1 | 9/2006 | Chan et al. | |
| 2006/0254087 A1 | 11/2006 | Fechter | |
| 2007/0011914 A1 | 1/2007 | Keen et al. | |
| 2007/0043582 A1 | 2/2007 | Peveto et al. | |
| 2008/0289218 A1 | 11/2008 | Nakano | |
| 2009/0013556 A1 | 1/2009 | Nishiwaki et al. | |
| 2009/0126225 A1 | 5/2009 | Jarvis | |
| 2009/0139112 A1 | 6/2009 | Garneau | |
| 2009/0183392 A1 | 7/2009 | Shane | |
| 2009/0211114 A1 | 8/2009 | Ivester et al. | |
| 2009/0293309 A1 | 12/2009 | Keating et al. | |
| 2010/0122471 A1 | 5/2010 | Edington et al. | |
| 2010/0170106 A1 | 7/2010 | Brewer et al. | |
| 2010/0199520 A1 | 8/2010 | Dua et al. | |
| 2010/0251565 A1 | 10/2010 | Litchfield et al. | |
| 2010/0281714 A1 | 11/2010 | Carboy et al. | |
| 2011/0099855 A1 | 5/2011 | Cho | |
| 2012/0117825 A9 | 5/2012 | Jarvis | |
| 2012/0167416 A1 | 7/2012 | Christensen et al. | |
| 2012/0178259 A1 | 7/2012 | Miyazaki et al. | |
| 2012/0180335 A1 | 7/2012 | Mahoney | |
| 2012/0186107 A1 | 7/2012 | Crary et al. | |
| 2013/0118036 A1 | 5/2013 | Gibson | |
| 2013/0145653 A1 | 6/2013 | Bradford | |
| 2013/0171019 A1 | 7/2013 | Gessler et al. | |
| 2013/0273347 A1 | 10/2013 | Jacobsen et al. | |
| 2013/0292862 A1 | 11/2013 | Joyce | |
| 2013/0295212 A1 | 11/2013 | Chen et al. | |
| 2014/0020191 A1 | 1/2014 | Jones et al. | |
| 2014/0026773 A1 | 1/2014 | Miller | |
| 2014/0029030 A1 | 1/2014 | Miller | |
| 2014/0033574 A1 | 2/2014 | Wan | |
| 2014/0109441 A1 | 4/2014 | McDowell et al. | |
| 2014/0150170 A1 | 6/2014 | Kim | |
| 2014/0150297 A1 | 6/2014 | Holmes et al. | |
| 2014/0182170 A1 | 7/2014 | Wawrousek et al. | |
| 2014/0223783 A1 | 8/2014 | Wardlaw et al. | |
| 2014/0226773 A1 | 8/2014 | Toth et al. | |
| 2014/0259779 A1 | 9/2014 | Hashish et al. | |
| 2014/0259787 A1 | 9/2014 | Guyan et al. | |
| 2014/0259788 A1 | 9/2014 | Dojan et al. | |
| 2014/0259789 A1 | 9/2014 | Dojan et al. | |
| 2014/0299009 A1 | 10/2014 | Miller et al. | |
| 2014/0300675 A1 | 10/2014 | Miller et al. | |
| 2014/0300676 A1 | 10/2014 | Miller et al. | |
| 2014/0310991 A1 | 10/2014 | Greene et al. | |
| 2015/0000161 A1 | 1/2015 | Peyton et al. | |
| 2015/0033577 A1 | 2/2015 | Dahl et al. | |
| 2015/0033579 A1 | 2/2015 | Barnes et al. | |
| 2015/0033581 A1 | 2/2015 | Barnes et al. | |
| 2015/0089841 A1 | 4/2015 | Smaldone et al. | |
| 2015/0128448 A1 | 5/2015 | Lockyer | |
| 2015/0181976 A1 | 7/2015 | Cooper et al. | |
| 2015/0223560 A1 | 8/2015 | Wawrousek et al. | |
| 2015/0245686 A1 | 9/2015 | Cross | |
| 2015/0331402 A1 | 11/2015 | Lin et al. | |
| 2015/0351493 A1 | 12/2015 | Ashcroft et al. | |
| 2015/0360419 A1 | 12/2015 | Willis et al. | |

(56) References Cited

U.S. PATENT DOCUMENTS

| | | | |
|---|---|---|---|
| 2016/0051009 A1 | 2/2016 | Kormann et al. | |
| 2016/0122493 A1* | 5/2016 | Farris | A43B 13/187 |
| | | | 521/82 |
| 2016/0137839 A1 | 5/2016 | Rolland et al. | |
| 2016/0160077 A1 | 6/2016 | Rolland et al. | |
| 2016/0180440 A1 | 6/2016 | Dibenedetto et al. | |
| 2016/0242502 A1 | 8/2016 | Spanks | |
| 2016/0288376 A1 | 10/2016 | Sun et al. | |
| 2016/0295971 A1 | 10/2016 | Arnese et al. | |
| 2016/0324260 A1* | 11/2016 | Guyan | A43B 13/04 |
| 2016/0324261 A1* | 11/2016 | Guyan | B33Y 80/00 |
| 2016/0325520 A1 | 11/2016 | Berger | |
| 2016/0360828 A1* | 12/2016 | Guyan | A43B 13/141 |
| 2016/0374428 A1* | 12/2016 | Kormann | A43B 13/188 |
| | | | 36/28 |
| 2017/0129167 A1 | 5/2017 | Castanon | |
| 2017/0129169 A1 | 5/2017 | Batchelder et al. | |
| 2017/0150778 A1 | 6/2017 | Youngs et al. | |
| 2017/0325544 A1 | 11/2017 | Ngene | |
| 2018/0014606 A1 | 1/2018 | Mokos | |
| 2018/0070736 A1* | 3/2018 | Achten | B29C 64/106 |
| 2018/0103719 A1 | 4/2018 | Chen | |
| 2018/0126630 A1 | 5/2018 | Panzer et al. | |
| 2018/0168284 A1 | 6/2018 | Robertson et al. | |
| 2018/0243976 A1 | 8/2018 | Feller | |
| 2018/0271211 A1* | 9/2018 | Perrault | A43B 13/181 |
| 2018/0271213 A1* | 9/2018 | Perrault | A43B 13/141 |
| 2018/0290374 A1 | 10/2018 | Willis et al. | |
| 2018/0368518 A1* | 12/2018 | Re | A43B 13/181 |
| 2019/0069632 A1 | 3/2019 | Meschter | |
| 2019/0098960 A1 | 4/2019 | Weisskopf et al. | |
| 2019/0160733 A1 | 5/2019 | Mirkin et al. | |
| 2019/0208859 A1 | 7/2019 | Mokos et al. | |
| 2019/0223543 A1 | 7/2019 | Tamm et al. | |
| 2019/0223551 A1 | 7/2019 | Hoffer et al. | |
| 2019/0269200 A1 | 9/2019 | Tseng | |
| 2019/0289960 A1 | 9/2019 | Loveder | |
| 2020/0093221 A1* | 3/2020 | Caldwell | A43B 3/0036 |
| 2020/0156308 A1 | 5/2020 | Ramos et al. | |
| 2020/0268098 A1 | 8/2020 | Jeng et al. | |
| 2020/0329815 A1 | 10/2020 | Schmid | |
| 2021/0177104 A1 | 6/2021 | Bellali et al. | |
| 2021/0195989 A1 | 7/2021 | Iwasa et al. | |
| 2021/0195995 A1* | 7/2021 | Sakamoto | A43B 7/32 |
| 2021/0321716 A1 | 10/2021 | Kormann et al. | |
| 2022/0104579 A1* | 4/2022 | Corcoran-Tadd | B29D 35/122 |
| 2022/0110406 A1* | 4/2022 | Salari-Sharif | A43B 1/0027 |
| 2022/0110407 A1* | 4/2022 | Hettinga | A43B 3/0036 |
| 2022/0110408 A1 | 4/2022 | Coonrod et al. | |
| 2022/0117359 A1 | 4/2022 | Cho et al. | |
| 2022/0142284 A1 | 5/2022 | Laperriere et al. | |
| 2022/0248800 A1 | 8/2022 | Lambertz | |
| 2023/0138934 A1 | 5/2023 | Kita et al. | |
| 2023/0150239 A1 | 5/2023 | Laurent et al. | |
| 2023/0189923 A1* | 6/2023 | Hettinga | B33Y 80/00 |
| | | | 36/28 |
| 2024/0032649 A1 | 2/2024 | Corcoran-Tadd et al. | |
| 2024/0122296 A1 | 4/2024 | Matsuhisa et al. | |
| 2024/0245165 A1 | 7/2024 | Chen | |
| 2024/0306765 A1* | 9/2024 | Salari-Sharif | B33Y 80/00 |
| 2024/0365922 A1* | 11/2024 | Salari-Sharif | A43B 13/181 |
| 2024/0365923 A1* | 11/2024 | Salari-Sharif | A43B 1/0009 |

FOREIGN PATENT DOCUMENTS

| | | | |
|---|---|---|---|
| CN | 203378623 U | 1/2014 | |
| CN | 209391169 U | 9/2019 | |
| CN | 209403686 U | 9/2019 | |
| CN | 110859355 A | 3/2020 | |
| EP | 0526892 A2 | 2/1993 | |
| EP | 2564719 A1 | 3/2013 | |
| EP | 2424398 B1 | 12/2015 | |
| EP | 3013171 A1 | 5/2016 | |
| EP | 3165109 A1 | 5/2017 | |
| EP | 2564714 B1 | 7/2018 | |
| EP | 3939462 A2 | 1/2022 | |
| ES | 2442448 A1 | 2/2014 | |
| ES | 2578730 A1 | 7/2016 | |
| JP | 3192899 B2 | 7/2001 | |
| JP | 2002238609 A | 8/2002 | |
| JP | 2011251190 A | 12/2011 | |
| JP | 2014151201 A | 8/2014 | |
| JP | 3192899 U | 9/2014 | |
| WO | WO-2010126708 A2 | 11/2010 | |
| WO | WO-2014008331 A2 | 1/2014 | |
| WO | WO-2014009587 A1 | 1/2014 | |
| WO | WO-2014015037 A2 | 1/2014 | |
| WO | WO-2014100462 A1 | 6/2014 | |
| WO | WO-2015164234 A1 | 10/2015 | |
| WO | WO-2015169941 A1 | 11/2015 | |
| WO | WO-2015169942 A1 | 11/2015 | |
| WO | WO-2016066750 A1 | 5/2016 | |
| WO | WO-2017210298 A1 | 12/2017 | |
| WO | WO-2021169804 A1 | 9/2021 | |

OTHER PUBLICATIONS

Green, D., Adidas is finally bringing 3D-printed shoes into the mainstream,BusinessInsider.com, Dennis Green, Retrieved from the Internet: (URL: https://www.businessinsider.com/adidas-releases-futurecraft-4d-shoe-2017-4/ commerce-on-business-insider), (Year: 2017).

Janusziewicz, R., et al., "Layerless Fabrication With Continuous Liquid Interface Production," Proceedings of the National Academy of Sciences of the United States of America 113(42): 11703-11708, National Academy of Sciences, United States (Oct. 2016).

Nikolic, I., Reebok Flexagon Training Shoes, Behance.net, Ilija Nikolic, Retrieved from the Internet (URL: https://www.behance.net/gallery/68953047/REEBOK-FLEXAGON-Training-Shoes?t-racking_source=curated_galleries_list) 2018, 10 pages.

Panetta., et al., "Elastic Textures for Additive Fabrication," ACM Transactions on Graphics 34(4), Article No. 135 (Aug. 2015).

Pearson, D., Adidas is giving Olympic athletes its first-ever 3D-printed shoes,Highsnobiety.com, Retrieved from the Internet: (URL: https://www.highsnobiety.com/2016/08/11/adidas-3d-printed-shoes-olympics/ ), (Year: 2016).

Reebok Flexagon, Retrieved from the Internet (URL: https://www.reebok.com/US/reebok-flexagon/CN2583.html ), 2018.

Richard, B., Here's what 3D printed Future Craft adidas Yeezy boosts would look like Yeezys geared up for the future Retrieved from the Internet: (URL: https://solecollector.com/news/2015/11/adidas-yeezy-futurecraft-3d-print ), (Year: 2015).

Tumbleston, J.R., et al., "Continuous Liquid Interface Production of 3d Objects," Science 347(6228):1349-1352, American Association for the Advancement of Science, United States (Mar. 2015).

Worman, C., Top Tennis Shoes Featuring a 6-Month Outsole Warranty, Retrieved from the Internet (URL: https://blogs.tennisexpress.com/blogs/top-tennis-shoes-featuring-a-6-month-outsole-warranty/), (Year: 2018), 11 pages.

* cited by examiner ially manufactured soles with features designed to couple with an upper and/or provide ground contacting features.

ADDITIVELY MANUFACTURED FOOTWEAR SOLES

FIELD

Embodiments described herein generally relate to soles and sole features for an article of footwear. Specifically, embodiments described herein relate to additively manufactured soles with features designed to couple with an upper and/or provide ground contacting features.

BACKGROUND

Footwear generally includes a sole that provides support and cushioning to a wearer's foot and an upper attached to the sole that encloses the wearer's foot. The sole may be constructed to provide the desired comfort and performance characteristics for the wearer. Soles may be made by molding a foam material, such as ethylene-vinyl acetate (EVA), among others.

Runners and other athletes may desire footwear having specific performance characteristics to optimize their performance. Further, customization of the sole may allow the footwear to be tailored to a particular athlete. Thus, a continuing need exists for soles that provide desired properties and performance characteristics.

BRIEF SUMMARY

Articles of footwear, and components thereof, according to the present disclosure may comprise one or more of the following features and combinations thereof.

A first embodiment (1) of the present application is directed to an article of footwear comprising a sole comprising: a three-dimensional mesh extending from a toe region to a heel region of the sole, the mesh comprising: a lattice structure comprising a plurality of interconnected unit cells, each interconnected unit cell comprising a plurality of struts defining a three-dimensional structure and a plurality of nodes at which one or more unit cell struts are connected, a ground-facing portion comprising a plurality of traction elements and located at a lower side of the mesh opposite an upper side, and a ledge formed on the upper side of the mesh and comprising a continuous side surface extending toward the lower side and along at least one of an outer lateral side or an outer medial side of the mesh; an upper coupled to the mesh; and a joining element extending between and coupling the ledge to the upper.

In a second embodiment (2), the mesh, the ledge, and the ground-facing portion according to the first embodiment (1), are integrally formed as a single piece.

In a third embodiment (3), the upper side of the mesh according to the first embodiment (1) or the second embodiment (2) comprises an upper surface with a substantially smooth overall surface contour.

In a fourth embodiment (4), the continuous side surface of the ledge according to any one of embodiments (1)-(3) extends around the heel region of the sole from the outer lateral side to the outer medial side of the mesh.

In a fifth embodiment (5), the ledge according to any one of embodiments (1)-(4) further comprises a solid top surface formed on an upper surface of the upper side of the mesh.

In a sixth embodiment (6), the joining element according to any one of embodiments (1)-(5) is coupled to the continuous side surface of the ledge.

In a seventh embodiment (7), the ledge according to any one of embodiments (1)-(6) extends into a midfoot region of the mesh.

In an eighth embodiment (8), the lower side of the mesh according to any one of embodiments (1)-(7) comprises a plurality of bumps and a plurality of valleys positioned between respective bumps, and the plurality of traction elements of the ground-facing portion are formed on each of the plurality of bumps.

In a ninth embodiment (9), each of the plurality of traction elements according to the eighth embodiment (8) comprises a separate continuous skin that covers a portion a respective one of the plurality of bumps.

In a tenth embodiment (10), the lower side of the mesh according to any one of embodiments (1)-(7) comprises a ground-facing perimeter rim and a middle portion within the ground-facing perimeter rim, and the plurality of traction elements of the ground-facing portion are formed on the ground-facing perimeter rim.

In an eleventh embodiment (11), the middle portion according to the tenth embodiment (10) is recessed relative to the perimeter rim.

In a twelfth embodiment (12), the ground-facing perimeter rim according to the tenth embodiment (10) comprises a continuous surface skin that extends around each of the toe region, a midfoot region, and the heel region of the sole and the plurality of traction elements are formed on the continuous surface skin.

A thirteenth embodiment (13) of the present application is directed to a sole for an article of footwear, the sole comprising: a three-dimensional mesh extending from a toe region to a heel region of the sole, the mesh comprising: a lattice structure comprising a plurality of interconnected unit cells, each interconnected unit cell comprising a plurality of struts defining a three-dimensional structure and a plurality of nodes at which one or more unit cell struts are connected, and an undulating lower side comprising a plurality of bumps and a plurality of valleys positioned between respective bumps, wherein the bumps are at least partially defined by one or more unit cells of the lattice structure; and a plurality of traction elements formed on the plurality of bumps of the undulating lower side of the mesh such that the plurality of traction elements are ground-facing.

In a fourteenth embodiment (14), the plurality of bumps according to the thirteenth embodiment (13) comprise a first bump of the plurality of bumps located in the toe region and comprising a first height measured between a first peak of the first bump and a bottom of an adjacent valley of the plurality of valleys, and a second bump of the plurality of bumps located in the heel region and comprising a second height measured between a second peak of the second bump and a bottom of an adjacent valley of the plurality of valleys, wherein the second height is different from the first height.

In a fifteenth embodiment (15), the second height according to the fourteenth embodiment (14) is larger than the first height.

In a sixteenth embodiment (16), each one of the plurality of traction elements according any one of embodiments (13)-(15) comprises a separate continuous skin that covers a portion a respective one of the plurality of bumps.

In a seventeenth embodiment (17), the continuous skin of each traction element according to the sixteenth embodiment (16) comprises a ribbed traction pattern.

In an eighteenth embodiment (18), at least one of the bumps of the plurality of bumps located in a toe region of the sole according to any one of embodiments (13)-(17) comprises a flatter contour than at least one of the bumps of the plurality of bumps located in the heel region of the sole.

In a nineteenth embodiment (19), the sole according to any of one embodiments (13)-(18) further comprises a plurality of connecting ribs formed on the undulating lower side of the mesh and extending between adjacent traction elements of the plurality of traction elements.

A twentieth embodiment (20) of the present application is directed to an sole for an article of footwear, the sole comprising: a three-dimensional mesh extending from a toe region to a heel region of the sole, the mesh comprising: a lattice structure comprising a plurality of interconnected unit cells, each interconnected unit cell comprising a plurality of struts defining a three-dimensional structure and a plurality of nodes at which one or more unit cell struts are connected; and a continuous ground-facing rim formed on a perimeter portion of a lower side of the mesh, wherein the continuous ground-facing rim extends around each of the toe region, a midfoot region, and the heel region of the sole, and wherein the continuous ground-facing rim comprises a plurality of traction elements formed on a ground-facing surface of the rim.

In a twenty-first embodiment (21), a recess according to the twentieth embodiment (20) is formed in the midfoot region of a middle portion of the mesh between the ground-facing rim.

In a twenty-second embodiment (22), the plurality of traction elements according to the twentieth embodiment (20) or the twenty-first embodiment (21) form a ribbed traction pattern.

In a twenty-third embodiment (23), the sole according to any one of embodiments (20)-(22) further comprises a plurality of connecting ribs formed on the mesh and extending through a middle portion of the lower side to connect a lateral side of the ground-facing rim to a medial side of the ground-facing rim.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
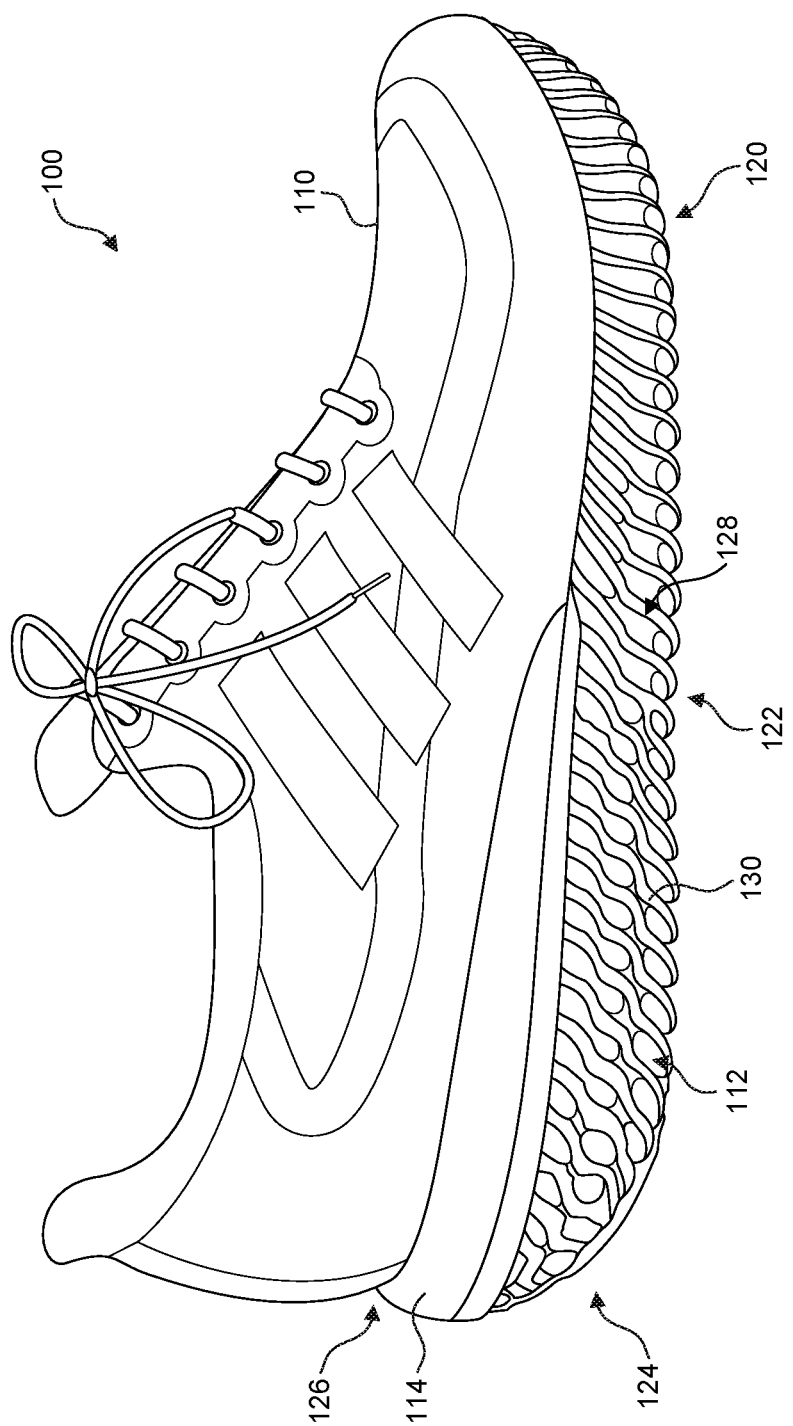
FIG. 1 illustrates a side view of an article of footwear having a sole coupled to an upper with a joining element, according to some embodiments.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

References in the specification to "some embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The indefinite articles "a," "an," and "the" include plural referents unless clearly contradicted or the context clearly dictates otherwise.

The term "comprising" is an open-ended transitional phrase. A list of elements following the transitional phrase "comprising" is a non-exclusive list, such that elements in addition to those specifically recited in the list can also be present.

As used herein, unless specified otherwise, references to "first," "second," "third," "fourth," etc. are not intended to denote order, or that an earlier-numbered feature is required for a later-numbered feature. Also, unless specified otherwise, the use of "first," "second," "third," "fourth," etc. does not necessarily mean that the "first," "second," "third," "fourth," etc. features have different properties or values.

Soles and midsoles of footwear can be formed by molding methods, such as by injection or compression molding. In some cases, when midsoles are molded in one piece, the properties of the resulting midsole cannot be made to vary across different portions of the midsole. As a result, the molded midsole may comprise isotropic properties. However, in some cases, it may be desirable to provide a midsole with mechanical properties that vary across or within different regions and/or that vary depending on the directions in which the midsole is loaded to improve the performance of the midsole and allow for customization of the performance of the midsole. For example, it may be desirable to provide a midsole with anisotropic properties that vary on different portions of the midsole in order to improve the performance of the midsole and allow for customization of the performance of the midsole.

Some embodiments described herein relate to footwear comprising a sole that comprises a three-dimensional mesh to provide the sole with desired properties, for example ground-contacting properties and anisotropic properties. In some embodiments, the mesh may be customized to provide different properties in different regions of the sole. In some embodiments, anisotropic properties may help to guide a foot of an athlete during sports movements, or may be used to guide a foot of a wearer in daily use. Further, selective mechanical deformation of the mesh may be achieved to provide stride length gains during phases of ground contact while walking or running. Such stride length gains can be optimized by selection of the geometry and dimensions of the mesh. In some embodiments, the mesh may absorb midfoot and heel strike forces and translate vertical momentum in running into forward momentum through angular-biased mesh features arranged to translate force applied in a desired direction and create angular rotation.

Some embodiments described herein relate to an article of footwear or a footwear component that comprises a sole comprising an undulating or irregular bottom surface formed on a lower side of a mesh to provide a plurality of traction elements dispersed across the lower side of the sole. As a result, footwear can be customized to provide the sole with mechanical properties that vary across or within different regions and/or that vary depending on the direction in which the midsole is loaded (for example, anisotropic properties) to provide performance improvements. Some embodiments described herein relate to an article of footwear or a footwear component comprising a three-dimensional mesh that is additively manufactured. The additive manufacturing techniques described herein can create footwear comprising custom properties produced by controlling the mesh geometry and dimensions.

Some embodiments described herein relate to an article of footwear or a footwear component comprising a sole comprising a substantially smooth or flat top surface. During manufacture of the sole, an upper side of the sole may be coupled to a build plate or printing head for additively manufacturing sole. Such a manufacturing configuration allows for additional freedom of design and construction of the lower side of the sole. For example, as described herein, the lower side (ground-facing side) can be customized to meet a user's desire for support or performance in the sole and/or can comprise an undulating or irregular bottom surface as described herein. Further, the lower side (ground-facing side) can be designed with peaks, valleys, and/or recesses as described herein. These peaks, valleys, and/or recesses can provide, among other things, cushioning properties, performance properties, and/or weight saving.

In addition to a customized bottom surface, the smooth top surface can also provide benefits in the assembly of the article of footwear. In some embodiments, the flat top surface may comprise integrally formed solid surfaces that increase a contact area for adhesion with other components of the article of footwear. In some embodiments, a ledge may be formed in the smooth or flat top surface that may comprise a large continuous surface area to adhere with a joining element, which in turn may couple with the upper. This large continuous surface may increase a bond strength of adhesion between the joining element and the ledge of the sole, compared to a bond strength of adhesion between the joining element and the mesh pattern in the sole.

As used herein, the term three-dimensional mesh refers to a three-dimensional structure comprising a plurality of interconnected unit cells arranged in a web-like structure or a lattice structure. The web-like or lattice structure of a mesh comprises interconnected structural members (struts) defining the plurality of unit cells. The structural members, and thus the unit cells, may be connected at nodes. For example, the interconnected structural members may be struts that are connected at nodes and that define unit cells arranged in a lattice configuration. In some embodiments, the plurality of interconnected unit cells may be arranged in a regular or repeating lattice configuration. Exemplary lattice configurations include, but are not limited to, basic cubic lattices, body-centered cubic lattices, face-centered cubic lattices, and modified lattices based on these lattice types. Exemplary lattice configurations include, but are not limited to, the lattice structures described in U.S. patent application Ser. Nos. 17/069,623 and 18/313,135, which are hereby incorporated by reference in their entireties.

Unit cells may comprise any of various dimensions and geometries. Further, unit cells within a three-dimensional mesh may be the same or may differ. Thus, a mesh may comprise unit cells of different dimensions or geometries. The three-dimensional shape of a unit cell may be defined by a plurality of interconnected struts connected to one another at nodes. In such embodiments, each unit cell may comprise a base geometry defined by the struts. As used herein, "base geometry" means the base three-dimensional shape, connection, and arrangement of the struts defining a unit cell. The base geometry of a unit cell may be, but is not limited to, a dodecahedron (for example, rhombic), a tetrahedron, an icosahedron, a cube, a cuboid, a prism, or a parallelepiped. Each node may connect two or more struts. Struts may be arranged to provide a mesh with the desired performance characteristics, and a mesh may comprise regions with different densities of struts.

In some embodiments, the interconnected unit cells may comprise a solid representation of a repeating implicit surface of a lattice structure. In such embodiments, the unit cells may comprise a "base surface geometry" defined by the base three-dimensional shape of a body formed by one or more ribbons (walls) of material that define a solid representation of an implicit surface for a full unit cell. In some embodiments, the implicit surface may be a periodic implicit surface such that the base surface geometry of each unit cell contacts the base surface geometry of at least some adjacent unit cells to create a lattice. One example of a suitable periodic surface is a gyroid, but any type of suitable periodic surface can be used.

Herein, a solid representation of an implicit surface refers to a solid object following the shape of an implicit surface. Whereas an actual implicit surface has no thickness, a solid representation of an implicit surface has a thickness on one or both sides of the actual implicit surface in a three dimensional space. The thickness gives the solid representation volume, meaning the solid representation can be built as a physical object from physical material. The added thickness or thicknesses may be uniform, or at least approximately uniform notwithstanding fillets or local deformities, and thin in comparison to the overall size of the represented implicit surface. In some embodiments, the relative density of a unit cell of the solid representation may be from 5% to 30%, from 5% to 40%, from 10% to 25%, or from 15% to 20%. The term "relative density" as used herein refers to an amount of a unit cell occupied by solid material as a percentage of a total volume of the unit cell.

In some embodiments, the implicit surfaces may be created using a combination of random Fourier series functions, in which linear and or nonlinear coefficient as well as linear and nonlinear variables inside sinuous and cosine terms over the x, y and z space are iterated to generate the functions. The resulting unit cells may have different planes of symmetry, such as, in various examples, zero planes of symmetry, one plane of symmetry, or more than one plane of symmetry. The function may be derived in a way that satisfies the periodicity of the unit cell. Criteria for the selection of an applicable implicit surface within the design space domain may comprise any one or any combination of number of terms in the equation, number of connected components, the edge boundary length, surface area, and volume fraction.

Soles for articles of footwear described herein (for example, sole 112), and any component of the soles footwear described herein may be formed by additive manufacturing (for example, three-dimensional (3D) printing). Exemplary additive manufacturing techniques include for example, selective laser sintering, selective laser melting, selective heat sintering, stereo lithography, fused deposition modeling, or 3-D printing in general. Various additive manufacturing techniques related to articles of footwear are described for example in US 2009/0126225, WO 2010/126708, US 2014/0300676, US 2014/0300675, US 2014/0299009, US 2014/0026773, US 2014/0029030, WO 2014/008331, WO 2014/015037, US 2014/0020191, EP 2564719, EP 2424398, and US 2012/0117825. In some embodiments, the additive manufacturing process may include a continuous liquid interface production process. For example, the additive manufacturing process may include a continuous liquid interface production process as described in U.S. Pat. No. 9,453,142, issued on Sep. 27, 2016, which is hereby incorporated in its entirety by reference thereto.

In some embodiments, 3-D printing a sole for an article of footwear, or component thereof, may comprise 3-D printing the sole or component in an intermediate green state, shaping the sole or component in the green state, and curing the green state in its final shape. In some embodiments, 3-D printing a sole for an article of footwear, or component thereof, may comprise 3-D printing the sole or component in an intermediate green state, expanding the intermediate green state, shaping the sole or component in the green state, and curing the green state in its final shape.

Techniques for producing an intermediate green state object from resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step may be carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Januszewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, US Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018) L. Robeson et al., PCT Patent Pub. No. WO 2015/164234 (see also U.S. Pat. Nos. 10,259,171 and 10,434,706); and C. Mirkin et al., PCT Patent Pub. No. WO 2017/210298 (see also US Pat. App. US 2019/0160733). The disclosures of these patents and applications are incorporated by reference herein in their entirety.

While stereolithography techniques such as CLIP may be preferred, it will be appreciated that other additive manufacturing techniques, such as jet printing (see, e.g., U.S. Pat. No. 6,259,962 to Gothait and US Patent App. Ser. No. US 2020/0156308 to Ramos et al.) may also be used.

In any of the embodiments described herein, a mesh may be selected to provide desired performance characteristics. A mesh may be tailored to provide a higher stiffness to weight ratio to provide a lightweight midsole, to control midsole shear stiffness to allow for or to prevent midsole shear, and to control energy return and damping.

Exemplary materials for sole 112 and components thereof (for example, mesh 130) include, but at not limited to, a foam, a rubber, ethyl vinyl acetate (EVA), a thermoplastic elastomer, a thermoplastic polyurethane (TPU), an expanded thermoplastic polyurethane (eTPU), an expanded elastomeric polyurethane, a polyether block amide (PEBA), an expanded polyether block amide (ePEBA), a thermoplastic rubber (TPR), and a polyolefin, for example polyethylene (PE), polystyrene (PS), polypropylene (PP), nylon (polyamides), carbon, graphene, carbon fiber, carbon nanotubes, fiber reinforced polymers, mycelium, aluminum, steel, titanium, or any other suitable material.

Some embodiments described herein relate to an article of footwear comprising an upper 110, a sole 112, and a joining element 114 configured to couple the sole 112 to the upper 110, as shown, for example, in FIG. 1. In some embodiments, article of footwear 100 may be a footwear component, such as a sole or a midsole, or may be a complete article of footwear, such as a shoe, sneaker, boot, or cleat, among other types of footwear. In the illustrative embodiment shown in FIGS. 1 and 2, joining element 114 overlaps with a portion of sole 112 and a portion of upper 110 to couple the upper 110 and sole 112 together. In some embodiments, joining element 114 can increase a bond strength between upper 110 and sole 112. In some embodiments, sole 112 may comprise a three-dimensional mesh 130 such that adjacent surfaces to upper 110 in article of footwear 100 are formed by lattice structure 140. In the illustrative embodiments shown in FIGS. 4A, 4B, and 5, a ledge 134 is formed around a heel region 124 of sole 112. Ledge 134 may provide a continuous surface for joining element 114 to adhere to.

In some embodiments, upper 110 may comprise a non-woven fabric, a woven fabric, or knitted textile material. In some embodiments, upper 110 may comprise a knit upper. A knit upper may be formed by flat knitting or circular knitting. In some embodiments, upper 110 may comprise a sock-type upper. Exemplary textile materials for upper 110 comprise, but are not limited to, thermoplastic polyurethane (TPU), polyester, polyamide, polyethylene (PE), PE foam, polyurethane (PU) foam, nylon, ultra-high molecular weight polyethylene (for example, DYNEEMA® (a type of ultra-high molecular weight polyethylene)), carbon fiber, KEVLAR® (a type of para-aramid), synthetic spider silk, cotton, wool, natural or artificial silk, polyethersulfone (PES), ELASTAN® (a polyether-polyurea copolymer), or a blend of two or more of these materials.

Figures 4A, 4B:
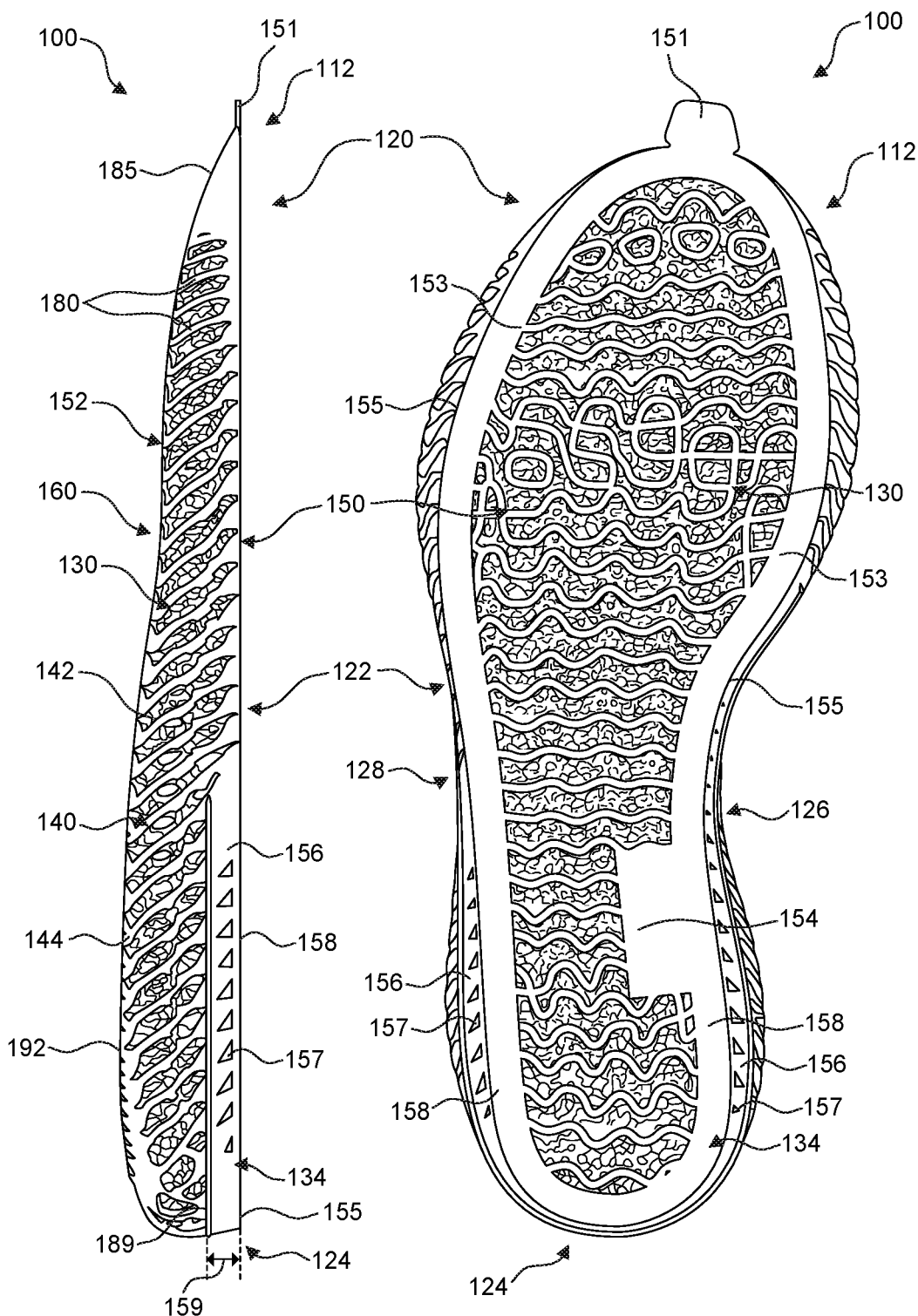
FIG. 4A illustrates a side view of a sole, according to some embodiments.
FIG. 4B illustrates a top-down view of the sole shown in FIG. 4A.
Figure 5:
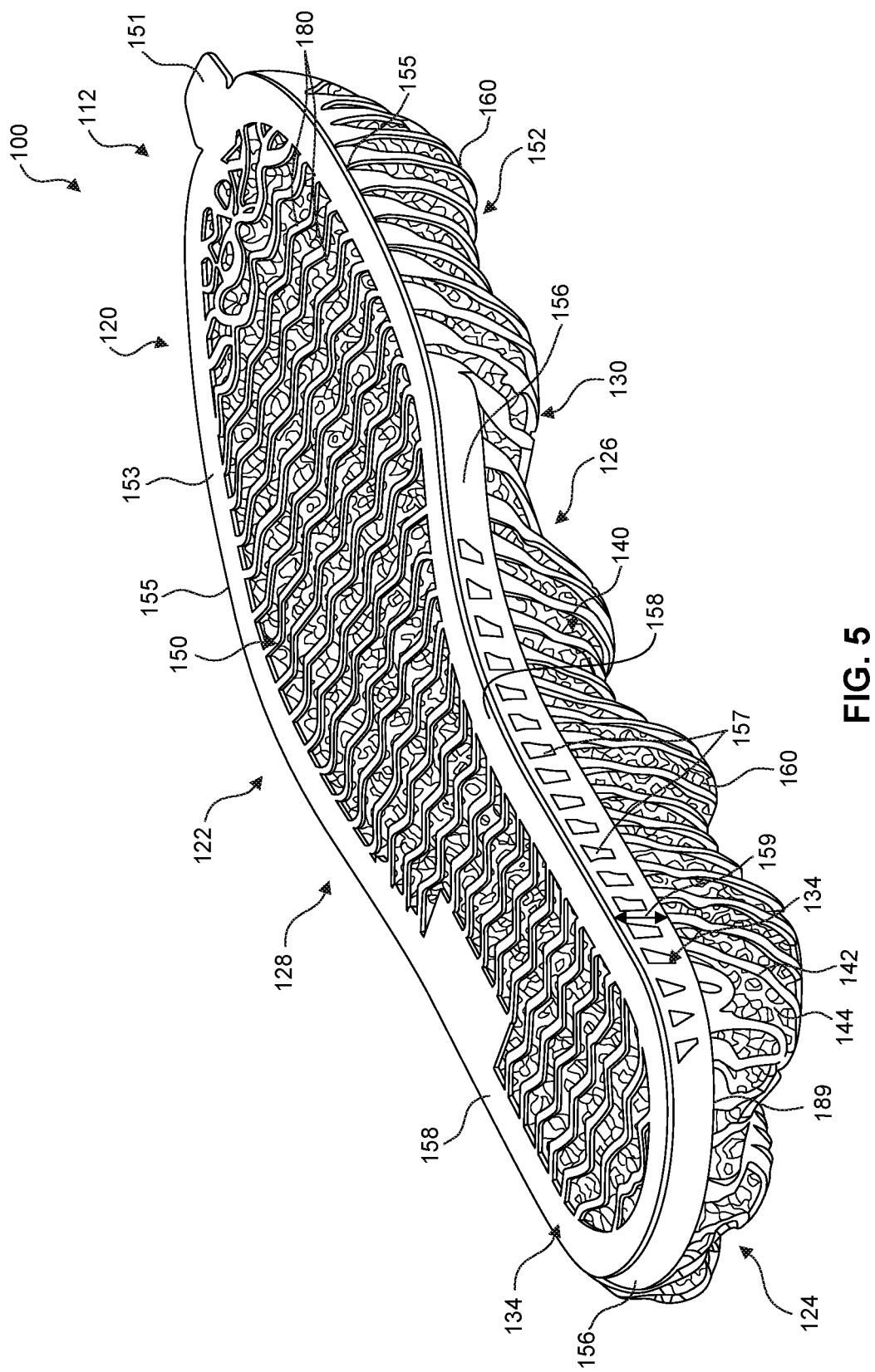
FIG. 5 illustrates a perspective top view of a sole, according to some embodiments.
Figure 6:
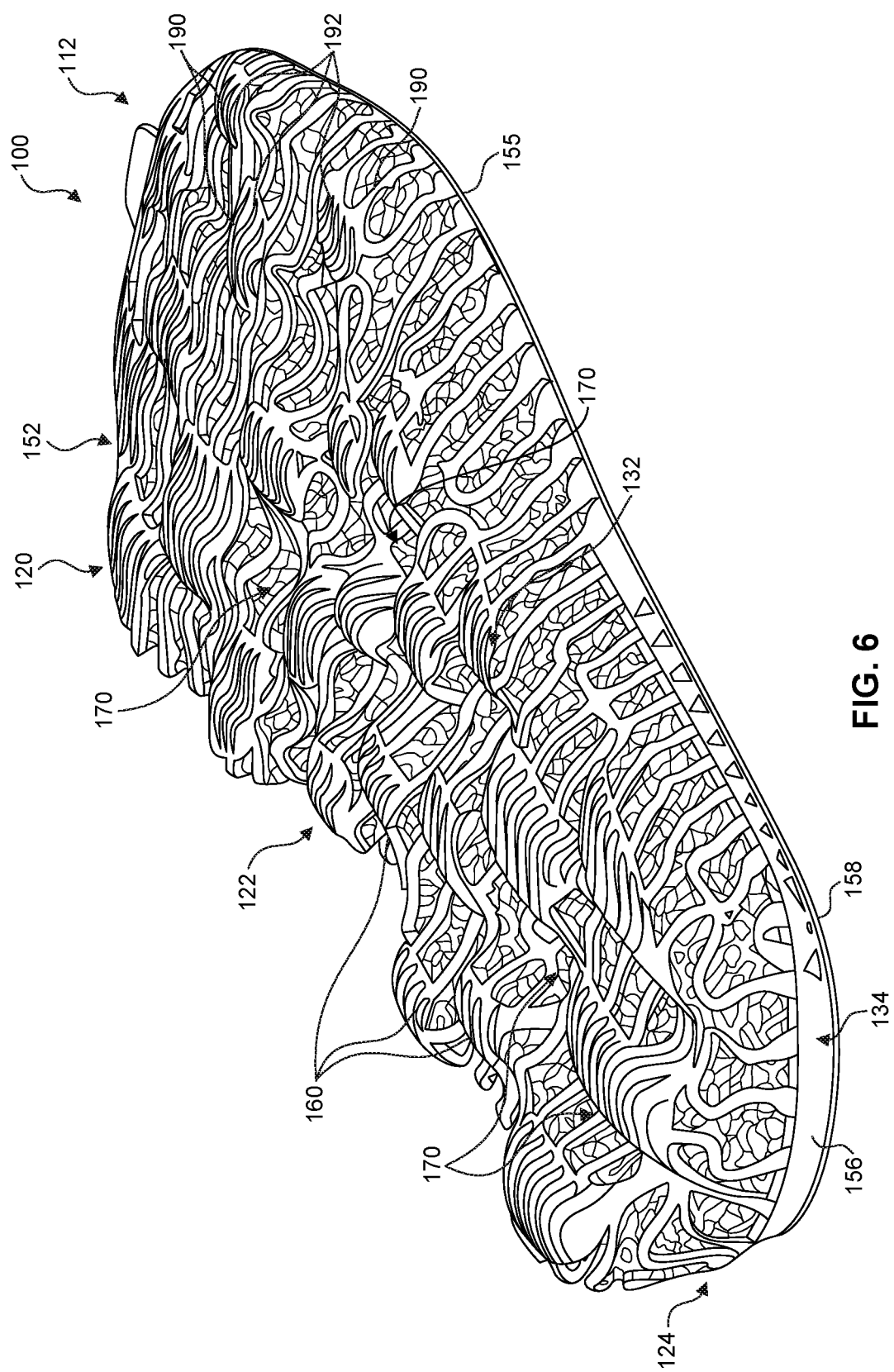
FIG. 6 illustrates a perspective bottom view of the sole shown in FIG. 5.

In some embodiments, sole 112 may comprise three-dimensional mesh 130, a ground-facing portion 132, and ledge 134, as shown, for example, in FIGS. 4A, 4B, and 5. In some embodiments, mesh 130, ground-facing portion 132, and ledge 134 may be integrally formed (for example integrally 3D printed) as a single piece sole 112. In some embodiments, at least two of mesh 130, ground-facing portion 132, and ledge 134 may be assembled and bonded together to form sole 112. Sole 112 may comprise a toe region 120, a midfoot region 122, a heel region 124, a medial side 126, and a lateral side 128, as shown, for example in FIGS. 4A and 4B.

Three-dimensional mesh 130 may provide sole 112 with desired properties, for example anisotropic properties, and/or allow sole 112 to be customized to provide different properties in different regions 120, 122, 124 of sole 112. For example, selective mechanical deformation of mesh 130 may provide stride length gains during phases of ground contact while walking or running, which may be optimized by selection of the geometry and dimensions of mesh 130. In addition, mesh 130 may be configured to absorb midfoot and heel strike forces and translate vertical momentum in running into forward momentum through angular-biased features arranged to translate force applied in a desired direction and create angular rotation.

In some embodiments, mesh 130 may be formed by any of the additive manufacturing (for example, three-dimensional (3D) printing) techniques described herein.

In the illustrative embodiment shown in FIGS. 1, 2, 4A, 4B, and 5, mesh 130 may comprise a plurality of interconnected unit cells 140 arranged in a web-like structure or a lattice structure. The plurality of unit cells 140 may be formed by a plurality of struts 142 connected together at a plurality of nodes 144. The plurality of struts 142 may be interconnected structural members that define a three-dimensional structure in mesh 130, and may determine the desired properties of sole 112. The plurality of struts 142 are connected at the plurality of nodes 144 and define unit cells 140 of mesh 130. In some embodiments, the plurality of interconnected unit cells 140 may be arranged in a regular or repeating lattice configuration.

In some embodiments, mesh 130 may comprise upper side 150 and lower side 152 as shown, for example, in FIGS. 4A-6. Upper side 150 may comprise upper surface 154 configured to contact upper 110 when the article of footwear 100 is assembled, and an upper perimeter edge 155 extending around the perimeter of upper surface 154. In some embodiments, upper surface 154 may comprise an upper perimeter rim 153 that forms a continuous surface around the perimeter edge 155 of the upper side 150. In some embodiments, a portion of unit cells 140 may be exposed on upper side 150 between the edges of the upper perimeter rim 153. In some embodiments, upper surface 154 may comprise a substantially smooth overall surface such the plurality of struts 142 have a flat profile at the upper surface 154. In some embodiments, upper surface 154 may comprise a shallow contour that follows an approximate shape of a user's foot. In some embodiments, upper surface 154 may have a first radius in toe region 120 and a second radius in midfoot region 122. In some embodiments, the first radius may be about 410 mm. In some embodiments, the first radius may be greater than or equal to about 400 mm to less than or equal to about 420 mm. In some embodiments, the second radius may be about 100 mm. In some embodiments, the second radius may be greater than or equal to about 90 mm to less than or equal to about 110 mm. In some embodiments, upper surface 154 may have a shape formed by a method as described in U.S. application Ser. No. 17/419,601, the disclosure of which is incorporated by reference herein in its entirety.

In some embodiments, upper perimeter rim 153 may comprise a toe bumper 151 internally formed with (for example, integrally 3D printed with) upper perimeter rim 153.

Ledge 134 may be formed on upper side 150 of sole 112 around heel region 124 as shown, for example, in FIGS. 4B and 5. Ledge 134 may be configured to provide a continuous surface 156, 158 to adhere with joining element 114. Ledge 134 may comprise a large continuous surface area to adhere with joining element 114. The continuous surface area of ledge 134 may increase a bond strength of adhesion between joining element 114 and ledge 134, compared to a bond strength of adhesion between joining element 114 and a plurality of interconnected unit cells 140 of mesh 130.

Ledge 134 may comprise a continuous side surface 156. In some embodiments, ledge may comprise a solid top surface 158 as shown, for example, in FIGS. 4A, 4B, and 5.

Solid top surface 158 may extend around heel region 124 and along upper surface 154 away from upper perimeter edge 155. In some embodiments, solid top surface 158 may be approximately perpendicular to continuous side surface 156. In some embodiments, solid top surface 158 may extend away from continuous side surface 156 at an obtuse angle relative to continuous side surface 156. In some embodiments, solid top surface 158 may form part of upper perimeter rim 153. In some embodiments, solid top surface 158 may extend beyond upper perimeter rim 153 and further from upper perimeter edge 155 than upper perimeter rim 153.

Continuous side surface 156 may extend around heel region 124 and away from upper perimeter edge 155 to a lower ledge edge 189 of ledge 134 along the outer medial side 126, the outer lateral side 128, or both, as shown, for example, in FIG. 5. In the illustrative embodiment shown in FIGS. 4B and 5, continuous side surface 156 extends along a portion of medial side 126 and lateral side 128 of sole 112, extending from the heel region 124 and into a midfoot region 122 of sole 112. In some embodiments, continuous side surface 156 may extend further along medial side 126 than lateral side 128. In some embodiments, continuous side surface 156 may extend further along lateral side 128 than medial side 126. In some embodiments, lower ledge edge 189 may be used to align, correctly position, and/or orient joining element 114 when sole 112 and upper 110 are coupled together.

In some embodiments, continuous side surface 156 extends a ledge distance 159 from upper perimeter edge 155 to a lower ledge edge 189, between upper side 150 and lower side 152. In some embodiments, ledge distance 159 may be greater than or equal to about 3 millimeters (mm) to less than or equal to about 15 mm from upper perimeter edge 155. In some embodiments, ledge distance 159 may be greater than or equal to about 5 mm to less than or equal to about 10 mm from upper perimeter edge 155. In some embodiments, ledge distance 159 may be about 10 mm from upper perimeter edge 155. In some embodiments, ledge distance 159 may be characterized as a portion of the distance between the upper side 150 and lower side 152 of sole 112. In some embodiments, ledge distance 159 may be greater than or equal to about 10% to less than or equal to about 50% of the distance between the upper side 150 and lower side 152 of sole 112. In some embodiments, ledge distance 159 may be greater than or equal to about 15% to less than or equal to about 40% of the distance between the upper side 150 and lower side 152 of sole 112.

In some embodiments, continuous side surface 156 is a solid component extending unbroken around sole 112. In some embodiments, a plurality of apertures 157 may be formed in continuous side surface 156 along the medial and lateral sides 126, 128 of sole 112. In some embodiments, the plurality of apertures 157 may allow for venting during manufacture of sole 112 to improve yield of sole 112 and reduce defects. In some embodiments, the plurality of apertures 157 provides venting during manufacture of sole 112 that may reduce manufacturing lead times for sole 112.

Figure 2:
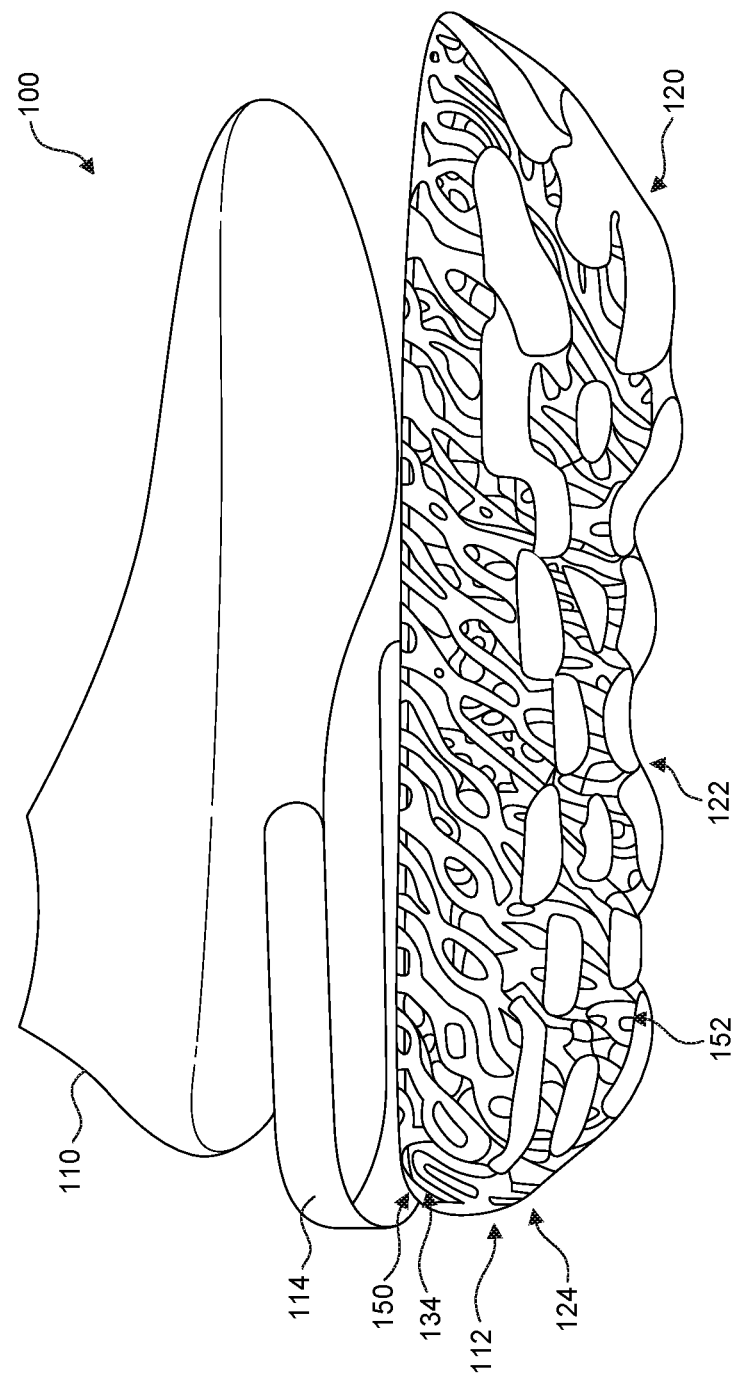
FIG. 2 illustrates an exploded view of an article of footwear including a sole, an upper, and a joining element, according to some embodiments.
Figure 3:
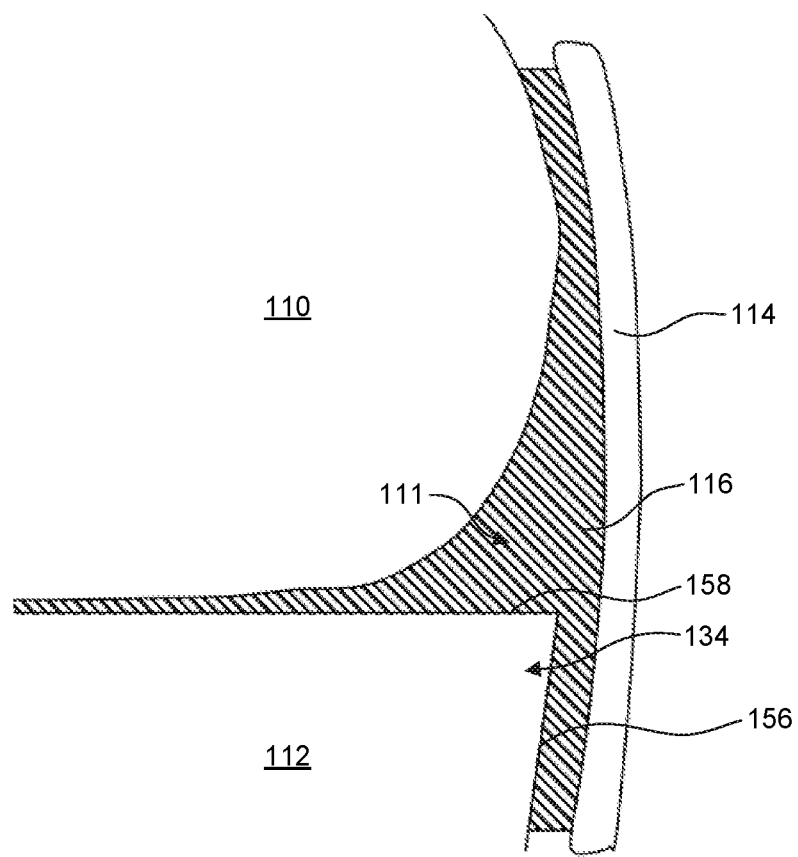
FIG. 3 illustrates a cross-sectional diagram of an assembled article of footwear showing a sole coupled to an upper with a joining element, according to some embodiments.

In the illustrative embodiments shown in FIGS. 1-3, upper 110 is coupled to sole 112 by joining element 114. In some embodiments, joining element 114 may be coupled to sole 112 with an adhesive 116, such as an epoxy, a glue, or any other suitable adhesives. Joining element 114 overlaps and is adhered to a portion or upper 110 with adhesive 116, and overlaps and is adhered to ledge 134 of sole 112 with adhesive 116. Overlapping of joining element 114 across upper 110 and ledge 134 of sole 112 may help to facilitate securement of sole 112 to upper 110. Ledge 134 may provide a greater adhesion contact area than unit cells 140 of mesh 130, and thereby allow for increased bonding strength between joining element 114 and sole 112. In some embodiments, joining element 114 may comprise foxing tape. In some embodiments, joining element 114 may comprise a flange that couples sole 112 to upper 110. In some embodiments, joining element 114 may comprise a molded clip. Suitable materials for joining element 114 may include, but are not limited to, a rubber, ethyl vinyl acetate (EVA), a thermoplastic elastomer, a thermoplastic polyurethane (TPU), an expanded thermoplastic polyurethane (eTPU), an expanded elastomeric polyurethane, a polyether block amide (PEBA), an expanded polyether block amide (ePEBA), a thermoplastic rubber (TPR), and a polyolefin, for example polyethylene (PE), polystyrene (PS) or polypropylene (PP), nylon (polyamides), or a foam comprising one or more of these materials. Additional suitable materials include graphene, carbon fiber, carbon nanotubes, fiber reinforced polymers, mycelium, aluminum, steel, titanium, or any other suitable material. In some embodiments, joining element 114 may comprise a material partially or fully melted to couple upper 110 and sole 112 together, for example, by infrared welding.

An illustrative example of the assembly of upper 110, sole 112, and joining element 114 is shown in FIG. 3. Upper 110 is assembled on upper surface 154 of mesh 130. Upper 110 may comprise a shape in the portions adjacent to sole 112 that contour to a user's foot. This shape may form gaps 111 between upper 110 and sole 112. In some embodiments, the gaps 111 are filled with adhesive 116 and covered by joining element 114 during construction of the article of footwear 100. In some embodiments, joining element 114 may form an outermost surface of the article of footwear 100 extending between the overlapping portion of upper 110 and ledge 134.

In some embodiments, as illustrated in for example FIGS. 5-9, lower side 152 of mesh 130 may comprise an undulating surface such that ground-facing portion 132 formed on lower side 152 of mesh 130. In some embodiments, lower side 152 of mesh 130 may comprise a plurality of bumps 160 and a plurality of valleys 170 positioned between respective bumps of the plurality of bumps 160. The plurality of bumps 160 are at least partially formed by one or more underlying unit cells 140 of mesh 130. Similarly, the plurality of valleys 170 are at least partially formed by one or more underlying unit cells 140 of mesh 130.

The plurality of bumps 160 may be dispersed across lower side 152 in a uniform or non-uniform pattern. In some embodiments, the plurality of bumps 160 may be dispersed across lower side 152 to provide support to desired portions of a user's foot. In some embodiments, the plurality of bumps 160 may be positioned to enhance performance of sole 112 for a user. In some embodiments, the underlying one or more unit cells 140 beneath the plurality of bumps 160 may comprise selective mechanical deformation for each respective bump 160 of the plurality of bumps 160. For example, a bump 162, 164 may absorb a strike force and translate vertical momentum in running into forward momentum through angular-biased mesh geometry arranged to translate force applied in a desired direction and create angular rotation.

In some embodiments, ground-facing portion 132 may comprise a plurality of traction elements 190 formed on each of the plurality of bumps 160 as shown, for example, in FIGS. 6-9. In some embodiments, each of the plurality of traction elements 190 may form a continuous skin 192 that covers a portion of a respective one of the plurality of bumps 160. In some embodiments, each continuous skin 192 may extend over each respective bump 160 and be configured to contact the ground during use. In such embodiments, sole 112 can be devoid of an outsole material disposed on skins 192. In some embodiments, each continuous skin 192 may be integrally formed (for example, integrally 3D printed) with mesh 130.

In some embodiments, each continuous skin 192 may comprise a traction pattern 194. In such embodiments, traction pattern 194 may serve to increase grip when sole 112 contacts the ground during use. In the illustrative embodiment in FIGS. 6 and 7, traction pattern 194 may comprise a ribbed traction pattern comprising a plurality of contoured ribs. In some embodiments, traction pattern 194 may comprise concentric ribbed circles, overlapping ribbed circles, wave shaped ribs, or any other suitable geometric shape. In some embodiments, traction pattern 194 may correspond to the sport the article of footwear 100 is used for. For example, traction pattern 194 may be designed for running in a straight line, such as on a treadmill, or may include lateral features to improve grip when a user changes direction.

In some embodiments, the plurality of bumps 160 may have different geometries across sole 112. For example, a first bump 162 in toe region 120 may differ in height, slope, and/or size compared to a second bump 164 in heel region 124. In some embodiments, the plurality of bumps 160 may differ in height, slope, and/or size within toe region 120. In some embodiments, the plurality of bumps 160 may differ in height, slope, and/or size within midfoot region 122. In some embodiments, the plurality of bumps 160 may differ in height, slope, and/or size within heel region 124.

Figure 8:
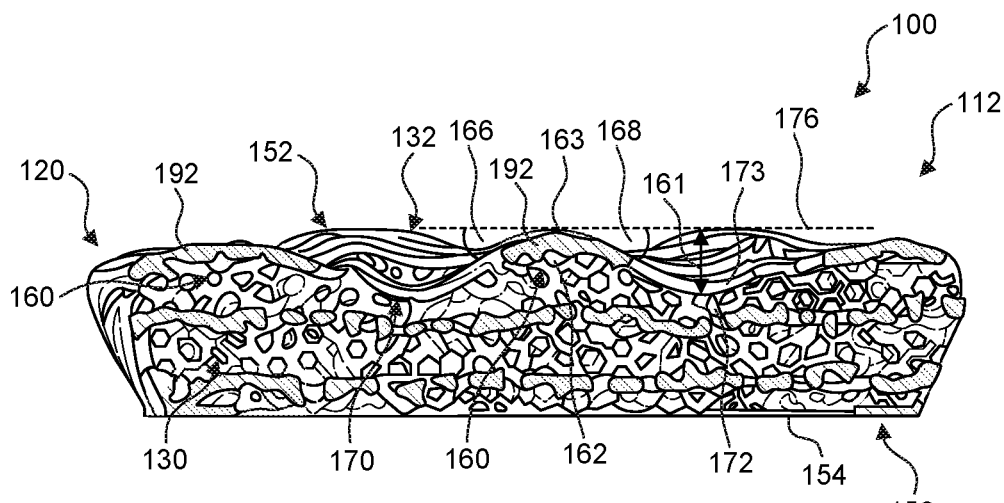
FIG. 8 illustrates a cross-sectional view of the sole in FIG. 7 along cross-sectional line 8-8.

In the illustrative embodiment shown in FIG. 8, first bump 162 has a first height 161. First height 161 may be measured from a first peak 163 at the apex of first bump 162 to a bottom 173 of an adjacent first valley 172 of the plurality of valleys 170. Similarly, second bump 164 may have a second height 165 a shown, for example, in FIG. 9. Second height 165 may be measured from a second peak 167 at the apex of second bump 164 to a bottom 175 of an adjacent second valley 174 of the plurality of valleys 170.

In some embodiments, second height 165 may be greater than first height 161. In such embodiments, second bump 164 may provide a greater depth of cushioning in the heel region 124 of sole 112. In such embodiments, first bump 162 may provide greater stiffness in the toe region 120 of sole 112. In some embodiments, second height 165 may be greater than first height 161 by at least about 2 mm. In some embodiments, first height 161 may be greater than second height 165. In some embodiments, first height 161 may be greater than second height 165 by at least about 2 mm. In some embodiment first and second bumps 162, 164 may have equal height 161, 165.

In some embodiments, first height 161 may be greater than or equal to about 0 mm to less than or equal to about 12 mm. In some embodiments, first height 161 may be greater than or equal to about 1 mm to less than or equal to about 12 mm. In some embodiments, first height 161 may be greater than or equal to about 4 mm to less than or equal to about 10 mm. In some embodiments, first height 161 may be greater than or equal to about 5 mm to less than or equal to about 7 mm.

In some embodiments, second height 165 may be greater than or equal to about 5 mm to less than or equal to about 30 mm. In some embodiments, first height 161 may be greater than or equal to about 7 mm to less than or equal to about 15 mm. In some embodiments, first height 161 may be about 10 mm.

In some embodiments, first bump 162 may comprise a flatter contour than at least one of the bumps of the plurality of bumps 160 located in the heel region of the sole 112 (for example, bump 164). In some embodiments, first bump 162 may have shallower slope extending between bottom 173 of first valley 172 and first peak 163 of bump 162 compared to second bump 164 that may have steeper slope extending between bottom 175 of second valley 174 and second peak 167 of bump 164.

In some embodiments, first bump 162 may have a first slope angle 166 on the medial side of first bump 162 between about 5 degrees and about 30 degrees relative to plane 176 that is tangential to peak 163 of the first bump 162 and parallel to substantially flat upper surface 154. In some embodiments, first bump 162 may have a second slope angle 168 on the lateral side of first bump 162 between about 5 degrees and about 30 degrees relative to plane 176. In some embodiments, first slope angle 166 and second slope angle 168 may be different. In some embodiments, first slope angle 166 and second slope angle 168 may be equal.

Figure 9:
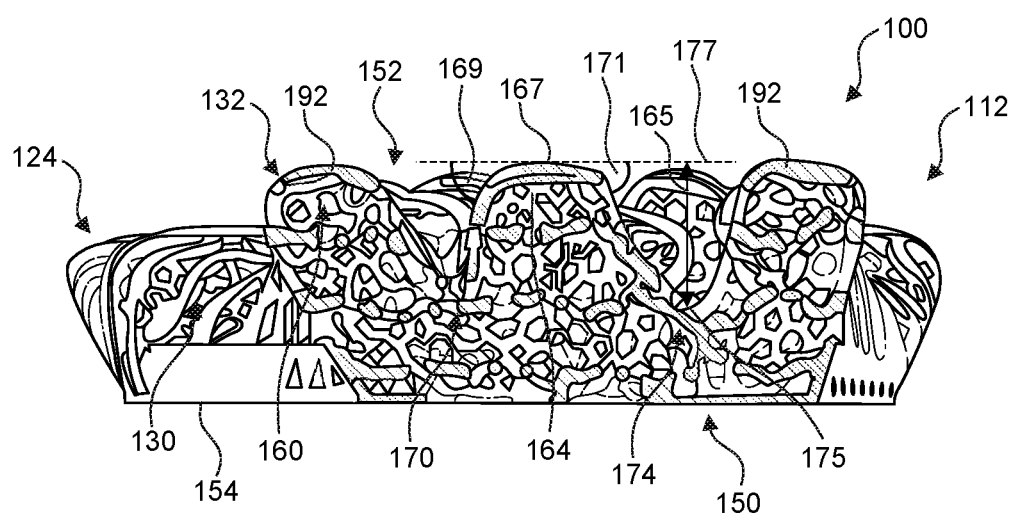
FIG. 9 illustrates a cross-sectional view of the sole in FIG. 7 along cross-sectional line 9-9.

In some embodiments, second bump 164 may have third slope angle 169 on the medial side of second bump 164 between 50 degrees and 85 degrees relative to plane 177 that is tangential to peak 167 of the second bump 164 and parallel to substantially flat upper surface 154. In some embodiments, second bump 164 may have fourth slope angle 171 on the lateral side of second bump 164 between 50 degrees and 85 degrees relative to plane 177. In some embodiments, third slope angle 169 and fourth slope angle 171 may be different. In some embodiments, third slope angle 169 and fourth slope angle 171 may be equal. Examples of slope angles 166, 168 of first bump 162 and slope angles 169, 171 of second bump 164 are shown in FIGS. 8 and 9.

In some embodiments, first bump 162 may have a flatter contour with a continuous arc extending from adjacent valleys 172. In some embodiments, second bump 164 may comprise a compound profile comprising steep side faces, an arc shaped ground-facing region, and radii connecting the steep side faces and arc shaped ground-facing region. As shown, for example, in FIGS. 8 and 9, the connecting radii of second bump 164 may be smaller than an average radius of the continuous arc of the first bump 162.

In some embodiments first and second bumps 162, 164 may have varying widths, from a lateral side to a medial side, that may be a function of bump height, slope angle, and/or radius. In some embodiments, a width of a bump on medial side 126 of sole 112 may be greater than a bump on lateral side 128 of sole 112. In some embodiments, a width of a bump on lateral side 128 of sole 112 may be greater than a bump on medial side 126 of sole 112. In some embodiments, the plurality of bumps 160 may be sized according to a gait pattern. In some embodiments, the plurality of bumps 160 may have greater width in a region of sole 112 where greater pressure is applied by a user according to the gait cycle or pattern. For example, the plurality of bumps 160 at medial side 126 of toe region 120 and lateral side 128 of heel region 124 may be wider than the plurality of bumps 160 at lateral side 128 of toe region 120 and medial side 126 of heel region 124.

In some embodiments, continuous skin 192 covering first bump 162 may have a greater surface area than continuous skin 192 covering second bump 164. In some embodiments, continuous skin 192 covering first bump 162 may have a smaller surface area than continuous skin 192 covering second bump 164.

Figure 7:
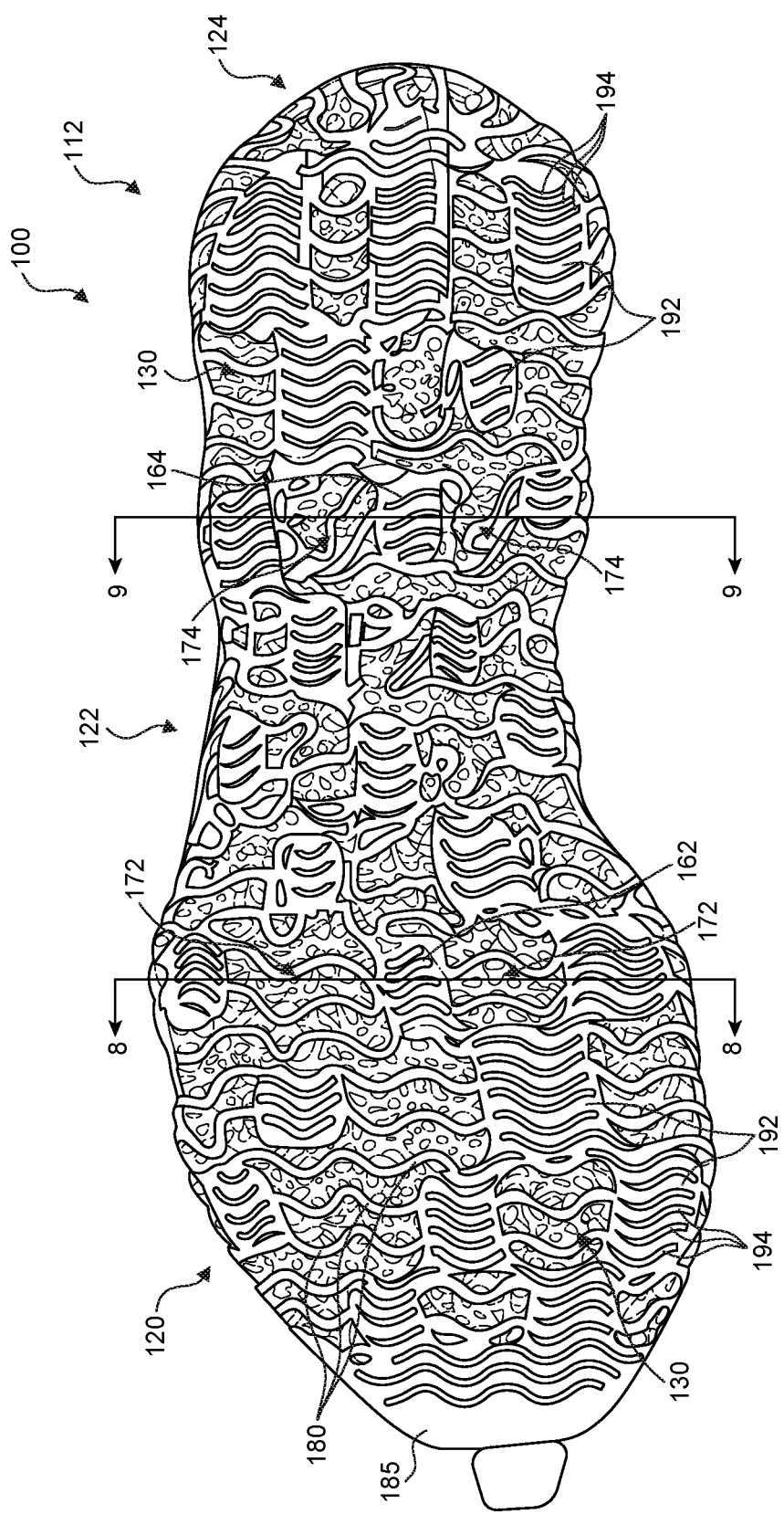
FIG. 7 illustrates a bottom-up view of the sole shown in FIG. 5.

In some embodiments, lower side 152 may comprise a plurality of connecting ribs 180 that extend between continuous skins 192 of the plurality of bumps 160 as shown, for example in FIG. 7. The plurality of connecting ribs 180 may be integrally formed (for example, integrally 3D printed) with continuous skins 192. In some embodiments, the plurality of connecting ribs 180 may be integrally formed (for example, integrally 3D printed) on the plurality of interconnected unit cells 140 of mesh 130. In embodiments comprising ribs 180, the plurality of connecting ribs 180 may tie adjacent traction elements 190 together, via continuous skins 192, such that the plurality of traction elements 190 may move together, or one traction element may resist movement of another traction element. Connecting ribs 180 may comprise flat strips of material that each extend from a first continuous skin 192 to a second continuous skin 192. In some embodiments, connecting ribs 180 may extend on to medial side 126 and/or lateral side 128 and may be integrally formed with upper perimeter rim 153 on upper side 150.

In some embodiments, as shown for example in FIG. 7, the plurality of connecting ribs 180 may comprise a wave or ripple shape between adjacent traction elements 190. In some embodiments, the plurality of connecting ribs 180 may extend substantially straight between adjacent traction elements 190. In some embodiments, the plurality of connecting ribs 180 may extend across the width of the sole 112, from medial side 126 to lateral side 128. In some embodiments, the plurality of connecting ribs 180 may extend across the length of the sole 112, from toe region 120 to heel region 124.

In some embodiments, sole 112 may additionally comprise an outsole attached to each of continuous skin 192 of the plurality of traction elements 190. In some embodiments, a spacer material may be secured to the continuous skins 192 and/or a forward toe portion 185 such that the outsole is attached to the spacer material rather than directly to the continuous skins 192 and/or a forward toe portion 185. In such embodiments, sole 112 may be connected to the outsole via any of various methods, such as by stitching, bonding, or by the use of adhesives, among other methods. The outsole may comprise a durable material, such as a natural or synthetic rubber, among others.

Figure 10:
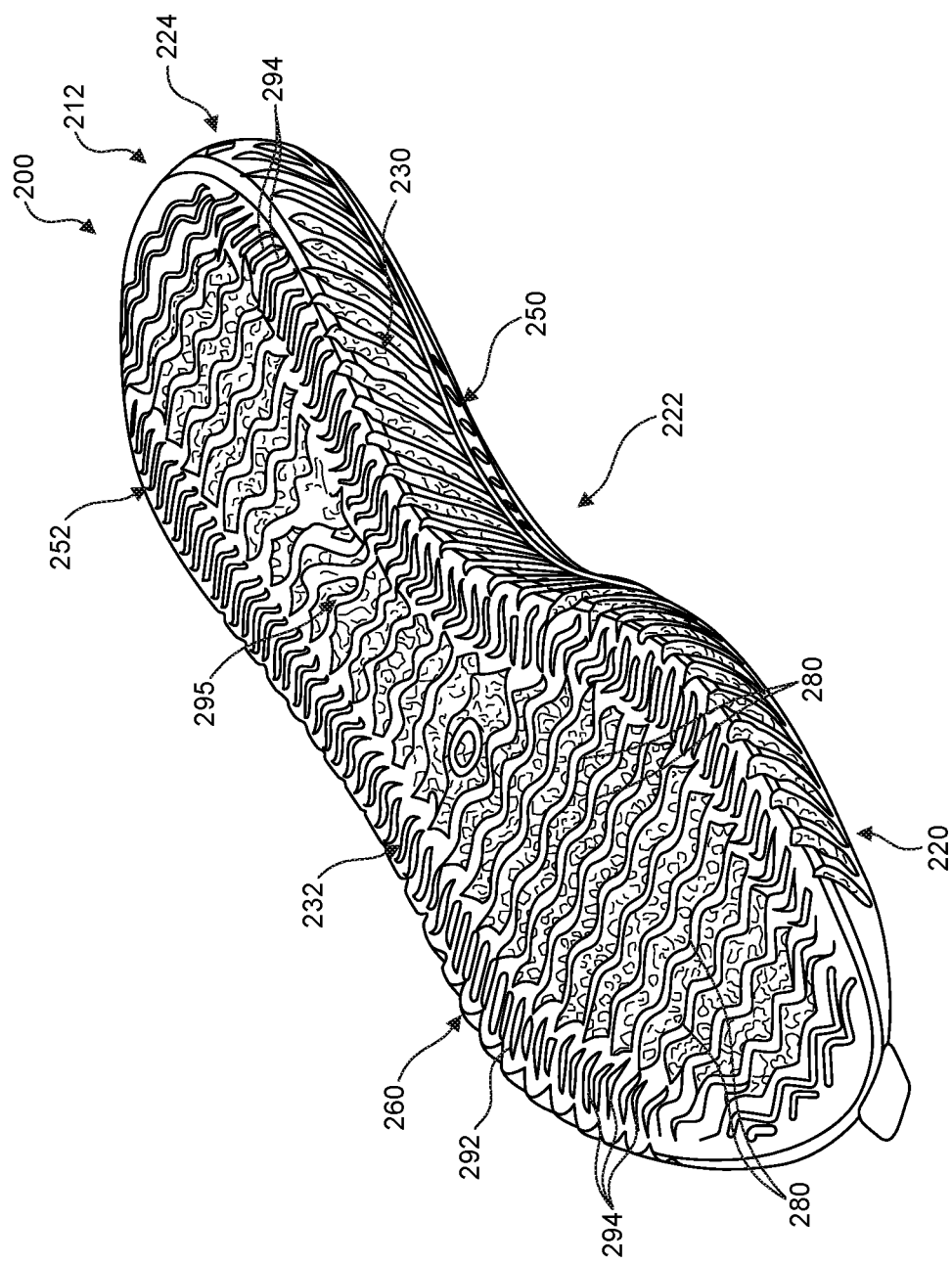
FIG. 10 illustrates a perspective bottom view of a sole, according to some embodiments.
Figure 11:
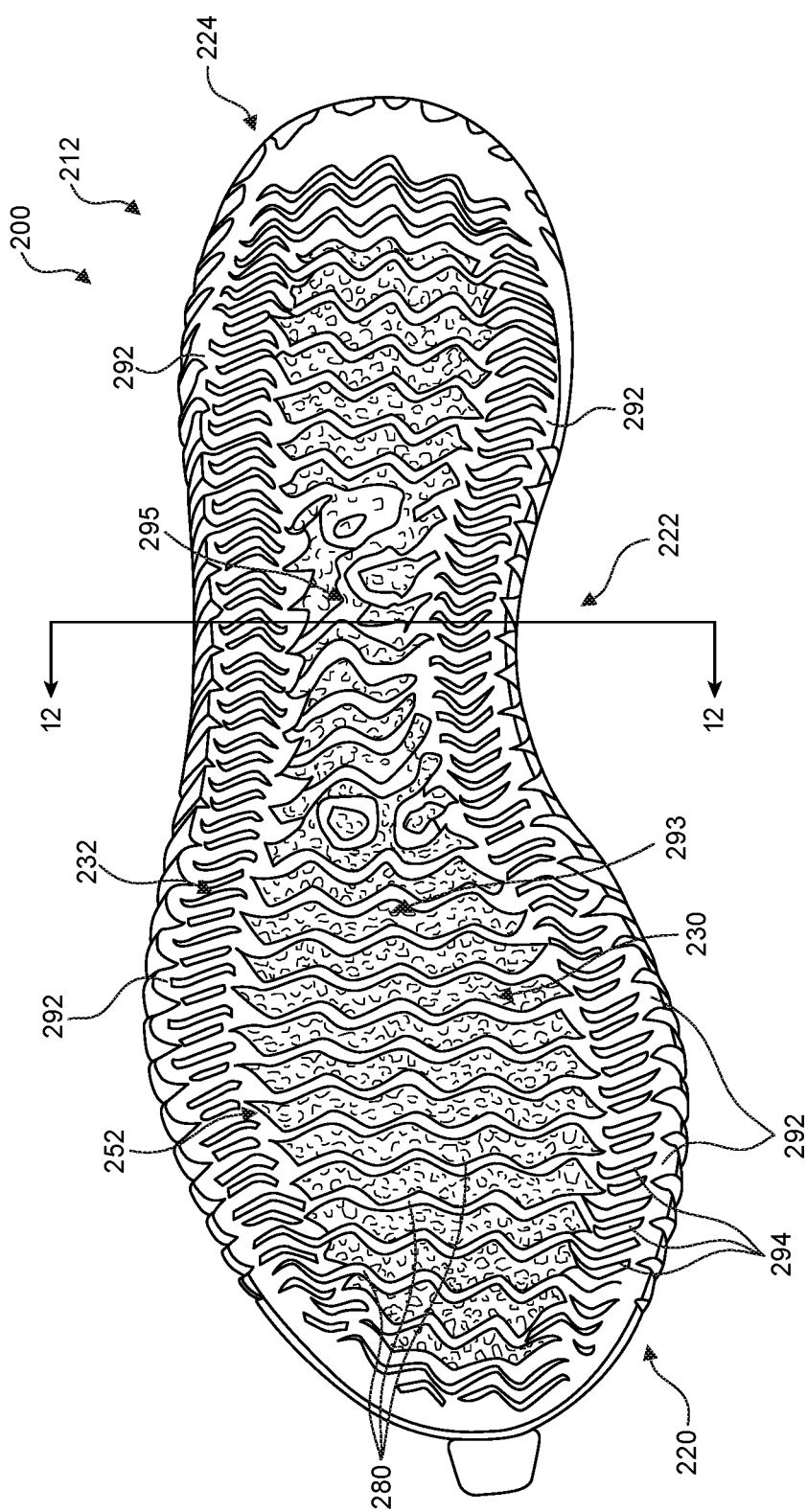
FIG. 11 illustrates a bottom-up view of the sole shown in FIG. 10.
Figure 12:
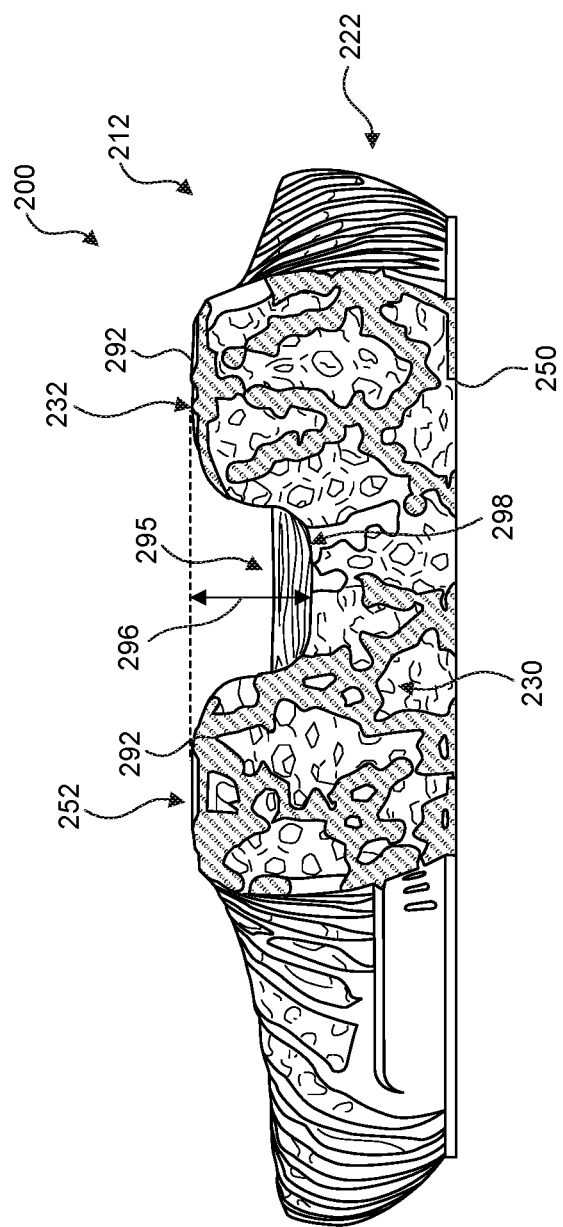
FIG. 12 illustrates a cross-sectional view of the sole in FIG. 11 along cross-sectional line 12-12.

Another embodiment of sole 112 in accordance with the present disclosure is shown in FIGS. 10-12. The sole 212 illustrated in FIGS. 10-12 is substantially similar to the sole 112 shown in FIGS. 1-9 and described herein. Accordingly, similar reference numbers in the 200 series indicate features that are common between sole 112 and sole 212. The description of sole 112 is incorporated by reference to apply to sole 212, except in instances when it conflicts with the specific description and the drawings of sole 212. For example, sole 212 may comprise ledge 134 and/or upper perimeter rim 153.

In the illustrative embodiment shown in FIGS. 10-12, sole 212 may comprise three-dimensional mesh 230 and a continuous ground-facing perimeter rim 232. Mesh 230 may be formed in substantially the same way a mesh 130 and comprise upper side 250 and lower side 252. Lower side 252 of mesh 230 may comprise a perimeter portion 260, and continuous ground-facing perimeter rim 232 may be formed on perimeter portion 260. In some embodiments, continuous ground-facing perimeter rim 232 may comprise a continuous skin surface 292 that covers the underlying mesh 230 at perimeter portion 260.

In some embodiments, continuous skin surface 292 may extend around at least two of the toe region 220, the midfoot region 222, and heel region 224 of lower side 252 of sole 212. In some embodiments, continuous skin surface 292 may extend around each of the toe region 220, the midfoot region 222, and heel region 224 of lower side 252 of sole 212.

In some embodiments, unit cells 140 of mesh 230 may be exposed on lower side 252 in a middle portion 293 between the edges of continuous skin surface 292 of continuous ground-facing perimeter rim 232.

In some embodiments, as shown for example in FIGS. 10-12, a recess 295 may formed in middle portion 293 of lower side 252 of mesh 230. In some embodiments, recess 295 may be formed in midfoot region 222 of middle portion 293. Recess 295 extends into sole 212 relative to lower side 252 and continuous skin surface 292 of continuous ground-facing perimeter rim 232. In some embodiments, recess 295 may be defined by a recessed region formed by unit cells 140 of mesh 230. In some embodiments, recess 295 may be disposed in midfoot region 222 between medial and lateral sides of continuous skin surface 292 of continuous ground-facing perimeter rim 232.

In the illustrative embodiment shown in FIG. 12, recess 295 has a depth 296. Depth 296 may be measured from continuous skin surface 292 to a base 298 of recess 295. In some embodiments, depth 296 may be greater than or equal to about 2 mm to less than or equal to about 15 mm. In some embodiments, depth 296 may be greater than or equal to about 5 mm to less than or equal to about 12 mm. In some embodiments, depth 296 may be about 10 mm. In some embodiments, recess 295 may comprise a maximum depth 296 that is greater than or equal to about 30% and less than or equal to about 70% of a total depth of sole 212 at the recess 295.

In some embodiments, continuous skin surface 292 may comprise a plurality of traction elements 294. In such embodiments, traction elements 294 may serve to increase grip when sole 212 contacts the ground as shown during use. In some embodiments, as illustrated in for example FIGS. 10 and 11, the plurality of traction elements 294 may comprise a ribbed traction pattern comprising a plurality of contoured ribs. In some embodiments, the plurality of traction elements 294 may comprise concentric ribbed circles, overlapping ribbed circles, wave shaped ribs, or any other suitable geometric shape. In some embodiments, the plurality of traction elements 294 may correspond to the sport the article of footwear 200 is used for. For example, the plurality of traction elements 294 may be designed for running in a straight line, such as on a treadmill, or may include lateral features to improve grip when a user changes direction.

In some embodiments, lower side 252 may comprise a plurality of connecting ribs 280 that extend between medial and lateral sides of continuous skin surface 292 of continuous ground-facing perimeter rim 232 as shown, for example in FIGS. 10 and 11. In some embodiments, the plurality of connecting ribs 280 may be integrally formed (for example, integrally 3D printed) with mesh 230. In such embodiments, the plurality of connecting ribs 280 may be integrally formed on the plurality of interconnected unit cells 140 of mesh 230. In some embodiments, the plurality of connecting ribs 280 may be integrally formed (for example, integrally 3D printed) with continuous skin surface 292.

In some embodiments, the plurality of connecting ribs 280 may extend across middle portion 293 of lower side 252 and tie opposite medial and lateral sides of continuous skin surface 292 together. In such embodiments, the plurality of connection ribs 280 may resist deformation of one side of the perimeter rim 232 compared to the other side. In some embodiments, as shown for example in FIGS. 10 and 11, the plurality of connecting ribs 280 comprise wave or ripple shape between adjacent sides of the continuous skin surface 292. In some embodiments, the plurality of connecting ribs 280 may extend substantially straight between adjacent sides of continuous skin surface 292. In some embodiments, the plurality of connecting ribs 280 may extend across the width of the sole 212, from medial to lateral sides. Connecting ribs 280 may comprise flat strips of material that each extend from a medial side to a lateral side of continuous skin surface 292.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" refers to a value that is within +10% of the value stated. For example, about 10% can include any percentage between 9% and 11%.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents

What is claimed is:

1. An article of footwear, comprising:
a sole comprising:
a three-dimensional mesh extending from a toe region to a heel region of the sole, the mesh comprising: a lattice structure comprising a plurality of interconnected unit cells, each interconnected unit cell comprising a plurality of struts defining a three-dimensional structure and a plurality of nodes at which one or more unit cell struts are connected;
a ground-facing portion comprising a plurality of traction elements and located at a lower side of the mesh opposite an upper side; and
a ledge formed on the upper side of the mesh and comprising a continuous side surface extending toward the lower side and along at least one of an outer lateral side or an outer medial side of the mesh, wherein the continuous side surface faces outwardly away from the outer lateral side or the outer medial side of the mesh;
an upper coupled to the mesh; and
a joining element extending between and coupling the outwardly facing continuous side surface of the ledge to the upper.

2. The article of footwear of claim 1, wherein the mesh, the ledge, and the ground-facing portion are integrally formed as a single piece.

3. The article of footwear of claim 1, wherein the continuous side surface of the ledge extends around the heel region of the sole from the outer lateral side to the outer medial side of the mesh.

4. The article of footwear of claim 3, wherein the ledge further comprises a solid top surface formed on an upper surface of the upper side of the mesh, wherein the solid top surface is disposed above the continuous side surface.

5. The article of footwear of claim 1, wherein the joining element is coupled to the continuous side surface of the ledge by adhesive.

6. The article of footwear of claim 1, wherein the lower side of the mesh comprises a plurality of bumps and a plurality of valleys positioned between respective bumps, and wherein the plurality of traction elements of the ground-facing portion are formed on each of the plurality of bumps.

7. The article of footwear of claim 6, wherein each of the plurality of traction elements comprises a separate continuous skin that covers a portion a respective one of the plurality of bumps.

8. The article of footwear of claim 1, wherein the lower side of the mesh comprises a ground-facing perimeter rim and a middle portion within the ground-facing perimeter rim, and wherein the plurality of traction elements of the ground-facing portion are formed on the ground-facing perimeter rim.

9. The article of footwear of claim 8, wherein the middle portion is recessed relative to the perimeter rim.

10. The article of footwear of claim 8, wherein the ground-facing perimeter rim comprises a continuous surface skin that extends around each of the toe region, a midfoot region, and the heel region of the sole and the plurality of traction elements are formed on the continuous surface skin.

11. A sole for an article of footwear, the sole comprising:
a three-dimensional mesh extending from a toe region to a heel region of the sole, the mesh comprising:
a lattice structure comprising a plurality of interconnected unit cells, each interconnected unit cell comprising a plurality of struts defining a three-dimensional structure and a plurality of nodes at which one or more unit cell struts are connected, and
an undulating lower side comprising a plurality of bumps and a plurality of valleys positioned between respective bumps, wherein the bumps are at least partially defined by one or more unit cells of the lattice structure; and
a plurality of traction elements formed on the plurality of bumps of the undulating lower side of the mesh such that the plurality of traction elements are ground-facing,
wherein a first bump of the plurality of bumps located in the toe region comprises a first height measured between a first peak of the first bump and a first bottom of an adjacent valley of the plurality of valleys, a second bump of the plurality of bumps located in the heel region comprises a second height measured between a second peak of the second bump and a second bottom of an adjacent valley of the plurality of valleys, and
wherein the second height is different from the first height.

12. The sole of claim 11, wherein the second height is larger than the first height.

13. The sole of claim 11, wherein each one of the plurality of traction elements comprises a separate continuous skin that covers a portion of a respective one of the plurality of bumps.

14. The sole of claim 13, wherein the continuous skin of each traction element comprises a ribbed traction pattern.

15. The sole of claim 11, wherein at least one of the bumps of the plurality of bumps located in the toe region of the sole comprises a flatter contour than at least one of the bumps of the plurality of bumps located in the heel region of the sole.

16. The sole of claim 11, wherein the sole further comprises a plurality of connecting ribs formed on the undulating lower side of the mesh and extending between adjacent traction elements of the plurality of traction elements.

17. A sole for an article of footwear, the sole comprising:
a three-dimensional mesh extending from a toe region to a heel region of the sole, the mesh comprising: a lattice structure comprising a plurality of interconnected unit cells, each interconnected unit cell comprising a plurality of struts defining a three-dimensional structure and a plurality of nodes at which one or more unit cell struts are connected; and
a continuous ground-facing rim formed on a perimeter portion of a lower side of the mesh,
wherein the continuous ground-facing rim extends around each of the toe region, a midfoot region, and the heel region of the sole, wherein the continuous ground-facing rim comprises a plurality of traction elements formed on a ground-facing surface of the rim, wherein the unit cells of the mesh form a recess in the midfoot region of a middle portion of the mesh between the ground-facing rim, and wherein a first plurality of connecting ribs are formed on the ground-facing side of the recess and extend across the recess to connect a lateral side of the ground-facing rim to a medial side of the ground-facing rim.

18. The article of footwear of claim 17, wherein the sole further comprises a second plurality of connecting ribs formed on the mesh and extending through a middle portion of the lower side of the toe region or the heel region to connect the lateral side of the ground-facing rim to the medial side of the ground-facing rim.

\* \* \* \* \*

UNITED STATES PATENT AND TRADEMARK OFFICE
CERTIFICATE OF CORRECTION

PATENT NO. : 12,414,602 B2
APPLICATION NO. : 18/400729
DATED : September 16, 2025
INVENTOR(S) : Delgado et al.

Page 1 of 1

It is certified that error appears in the above-identified patent and that said Letters Patent is hereby corrected as shown below:

In the Claims

In Column 17, Claim 7, Line 63, delete "portion" and insert -- portion of --, therefor.

Signed and Sealed this
Second Day of December, 2025

John A. Squires
*Director of the United States Patent and Trademark Office*